United States Patent
Stopper, Jr. et al.

(10) Patent No.: US 6,302,438 B1
(45) Date of Patent: Oct. 16, 2001

(54) OCCUPANT DETECTION SYSTEM

(75) Inventors: Robert A. Stopper, Jr., Plymouth; James G. Stanley, Novi, both of MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/294,675

(22) Filed: Apr. 19, 1999

Related U.S. Application Data

(60) Provisional application No. 60/082,523, filed on Apr. 21, 1998, and provisional application No. 60/119,694, filed on Feb. 11, 1999.

(51) Int. Cl.[7] .................................................. B60R 21/32

(52) U.S. Cl. .............................................. 280/735; 701/45

(58) Field of Search ........................... 280/735; 180/271; 701/45

(56) References Cited

U.S. PATENT DOCUMENTS

| | | | |
|---|---|---|---|
| 3,672,699 | * 6/1972 | De Windt | 280/150 AB |
| 3,740,567 | * 6/1973 | Atkins | 307/10 SB |
| 3,767,002 | * 10/1973 | Gillund | 180/102 |
| 3,898,472 | * 8/1975 | Long | 307/10 SB |
| 4,300,116 | * 11/1981 | Stahovec | 340/32 |
| 4,625,329 | * 11/1986 | Ishikawa et al. | 382/1 |
| 4,796,013 | * 1/1989 | Yasuda et al. | 340/562 |
| 4,831,279 | * 5/1989 | Ingraham | 307/116 |
| 4,980,519 | * 12/1990 | Mathews | 178/19 |
| 5,071,160 | * 12/1991 | White et al. | 280/735 |
| 5,074,583 | * 12/1991 | Fujita et al. | 280/735 |
| 5,118,134 | 6/1992 | Mattes et al. | 280/735 |
| 5,161,820 | 11/1992 | Vollmer | 280/730 |
| 5,205,582 | 4/1993 | Shiga et al. | 280/735 |
| 5,214,388 | 5/1993 | Vranish et al. | 324/683 |
| 5,232,243 | 8/1993 | Blackburn et al. | 280/732 |
| 5,247,261 | 9/1993 | Gershenfeld | 324/716 |
| 5,330,226 | 7/1994 | Gentry et al. | 280/735 |

(List continued on next page.)

FOREIGN PATENT DOCUMENTS

| | | |
|---|---|---|
| 44 33 601 C1 | 4/1996 | (DE) . |
| 4433601 | * 4/1996 | (DE) . |
| 19637108 | * 3/1998 | (DE) . |
| 196 37 108 A1 | 3/1998 | (DE) . |
| 09071214 | * 3/1997 | (JP) . |
| H-9 071214 | 3/1997 | (JP) . |
| H-9 315263 | 12/1997 | (JP) . |
| 09315263 | * 12/1997 | (JP) . |

OTHER PUBLICATIONS

Lawrence Livermore Labs; "Micropower Impulse Radar (MIR)", from http://lasers.llnl.gov/lasters/idp/mir/files/MIR_info.html (printed on Apr. 17, 1998).*

Smith, J.R.; "Field Mice: Extracting hand geometry from electric field measurements", IBM Systems Journal, vol. 35. Nos. 3&4, 1996.*

Fink, Donald G. and Beaty, H. W.; Standard Handbook for Electrical Engineers 12th ed., McGraw–Hill, 1987, pp. 3–57 through 3–65.*

*Primary Examiner*—Brian L. Johnson
*Assistant Examiner*—Bryan Fischmann
(74) *Attorney, Agent, or Firm*—Dinnin & Dunn P. C.

(57) ABSTRACT

An occupant detection system (10) for controlling the activation of an air bag inflator (42) incorporates a transmitter/receiver subsystem (16) and a ranging subsystem (20) that respectively measure the distances from a point of reference to the upper seat back (22) and to the region in front of the upper seat back (22). If a normally seated occupant is detected from the difference of the respective distances, then the air bag inflator (42) is enabled. A range/proximity sensing subsystem (14) determines if an occupant is sufficiently close to an air bag inflator (42) to be at risk of injury by deployment thereof, and if so the air bag inflator (42) is disabled.

52 Claims, 6 Drawing Sheets

U.S. PATENT DOCUMENTS

| | | | |
|---|---|---|---|
| 5,366,241 | 11/1994 | Kithill | 280/735 |
| 5,398,185 | 3/1995 | Omura | 364/424.05 |
| 5,404,128 | 4/1995 | Ogino et al. | 340/425.5 |
| 5,411,289 | 5/1995 | Smith et al. | 280/735 |
| 5,413,378 | 5/1995 | Steffens, Jr. et al. | 280/735 |
| 5,439,249 | 8/1995 | Steffens, Jr. et al. | 280/735 |
| 5,446,661 | 8/1995 | Gioutsos et al. | 364/424.05 |
| 5,454,591 | 10/1995 | Mazur et al. | 280/735 |
| 5,474,327 | 12/1995 | Schousek | 280/735 |
| 5,482,314 | 1/1996 | Corrado et al. | 280/735 |
| 5,490,069 | 2/1996 | Gioutsos et al. | 364/424.05 |
| 5,494,311 | 2/1996 | Blackburn et al. | 280/735 |
| 5,515,933 | 5/1996 | Meyer et al. | 180/273 |
| 5,525,843 | 6/1996 | Howing | 307/9.1 |
| 5,528,698 | 6/1996 | Kamei | 382/100 |
| 5,531,472 | 7/1996 | Semchena et al. | 280/735 |
| 5,549,323 | 8/1996 | Davis | 280/728.3 |
| 5,570,903 | 11/1996 | Meister et al. | 280/735 |
| 5,573,269 | 11/1996 | Gentry et al. | 280/735 |
| 5,589,838 | 12/1996 | McEwan | 342/387 |
| 5,602,734 | 2/1997 | Kithil | 364/424.055 |
| 5,612,876 | 3/1997 | Zeidler et al. | 364/424.055 |
| 5,618,056 | 4/1997 | Schoos et al. | 280/735 |
| 5,624,132 | 4/1997 | Blackburn et al. | 280/735 |
| 5,626,359 | 5/1997 | Steffens, Jr. et al. | 280/735 |
| 5,636,864 | 6/1997 | Hori | 280/735 |
| 5,653,462 | 8/1997 | Breed et al. | 280/735 |
| 5,661,490 | 8/1997 | McEwan | 342/387 |
| 5,691,693 | 11/1997 | Kithil | 340/439 |
| 5,694,320 | 12/1997 | Breed | 364/424.055 |
| 5,702,123 | 12/1997 | Takahashi et al. | 280/735 |
| 5,731,781 | 3/1998 | Reed | 342/135 |
| 5,748,473 | 5/1998 | Breed et al. | 364/424.055 |
| 5,782,485 * | 7/1998 | Taketa et al. | 280/735 |
| 5,802,479 | 9/1998 | Kithill et al. | 701/45 |
| 5,822,707 | 10/1998 | Breed et al. | 701/49 |
| 5,829,782 | 11/1998 | Breed et al. | 280/735 |
| 5,835,613 | 11/1998 | Breed et al. | 382/100 |
| 5,844,486 * | 12/1998 | Kithil et al. | 280/735 X |
| 5,845,000 | 12/1998 | Breed et al. | 382/100 |
| 5,848,802 | 12/1998 | Breed et al. | 280/735 |
| 5,871,232 * | 2/1999 | White | 280/735 |
| 5,890,085 * | 3/1999 | Corrado et al. | 180/271 X |
| 5,901,978 | 5/1999 | Breed et al. | 280/735 |
| 5,943,295 | 8/1999 | Varga et al. | 367/99 |
| 5,954,360 * | 9/1999 | Griggs, III et al. | 280/735 |
| 5,964,478 | 10/1999 | Stanley et al. | 280/735 |
| 5,983,147 * | 11/1999 | Krumm | 701/45 |
| 6,007,095 * | 12/1999 | Stanley | 280/735 |
| 6,014,602 | 1/2000 | Kithil et al. | 701/45 |
| 6,027,138 * | 2/2000 | Tanaka et al. | 280/735 |
| 6,039,139 * | 3/2000 | Bred et al. | 180/271 |
| 6,043,743 | 3/2000 | Saito et al. | 340/562 |
| 6,078,854 * | 6/2000 | Breed et al. | 701/45 X |
| 6,081,757 * | 6/2000 | Breed et al. | 701/45 |
| 6,113,137 * | 9/2000 | Mizutani et al. | 280/735 |
| 6,116,639 * | 9/2000 | Breed et al. | 280/735 |
| 6,158,768 * | 12/2000 | Steffens, Jr. et al. | 280/735 |
| 6,170,866 * | 1/2001 | Popp et al. | 280/735 |
| 6,203,059 * | 3/2001 | Mazur et al. | 280/735 |
| 6,220,627 * | 4/2001 | Stanley | 280/735 |

\* cited by examiner

OCCUPANT DETECTION SYSTEM

CROSS-REFERENCE TO RELATED APPLICATIONS

The instant application claims the benefit of prior U.S. Provisional Application Ser. No. 60/082,523 filed on Apr. 21, 1998.

The instant application also claims the benefit of prior U.S. Provisional Application Ser. No. 60/119,694 filed on Feb. 11, 1999.

Commonly owned U.S. application Ser. No. 09/294,752, entitled "Occupant Detection System", filed on the same date as the instant application, claiming benefit of U.S. Provisional Application Ser. No. 60/082,408 filed on Apr. 20, 1998, claiming benefit of U.S. Provisional Application Ser. No. 60/082,443 filed on Apr. 20, 1998, and claiming benefit of U.S. Provisional Application Ser. No. 60/082,528 filed on Apr. 21, 1998 discloses an occupant detection system comprising a transmitter/receiver subsystem that detects the interaction of an occupant with a beam of wave energy that is disposed in a region that is occupied by a normally seated occupant, and that is not occupied by either an out-of-position occupant or a rear facing infant seat.

Commonly owned U.S. application Ser. No. 09/294,680, entitled "Occupant Detection System", filed on the same date as the instant application, claiming benefit of U.S. Provisional Application Ser. No. No. 60/082,517 filed on Apr. 21, 1998 discloses an occupant detection system comprising a radar module that is activated responsive to either a crash or to the presence of an occupant in the at-risk region proximate to an air bag inflator.

Commonly owned U.S. application Ser. No. 08/911,488, entitled "Occupant Position Sensing System", filed on Aug. 14, 1997, now U.S. Pat. No. 5,871,232 discloses an occupant position sensing system comprising a ranging sensor in combination with a capacitive sensor.

Commonly owned U.S. application Ser. No. 08/911,148, entitled "Electric Field Sensing Air Bag Danger Zone Sensor", filed on Aug. 14, 1997 now U.S. Pat. No. 5,964,478 discloses a capacitive danger-zone sensor.

Commonly owned U.S. application Ser. No. 08/841,521, entitled "Occupant Position Sensing System", filed on Apr. 23, 1997, now U.S. Pat. No. 6,005,958 discloses a vision-based system for sensing occupant position.

The above-described applications are incorporated herein by reference.

TECHNICAL ART

The instant invention generally relates to occupant detection systems for controlling the activation of vehicular safety restraint systems and more particularly for determining the presence and position of an occupant, or the position of the vehicle seat, for purposes of influencing the deployment of a safety restraint system responsive to a crash.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. For example, unbelted occupants subjected to severe pre-impact braking are particularly vulnerable to being out-of-position at the time of deployment. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bags can be beneficial to any forward facing occupant when that occupant is a significant distance from the inflator door. Air bags, however, can be lethal to infants in rear facing infant seats (RFIS). Air bags can also be hazardous to forward facing occupants if they are too close to the inflator at the time of vehicle impact, such as when an unbelted occupant is subjected to severe pre-impact braking. Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants; to small or frail occupants such as children, small women, or elderly occupants; or to infants in rear facing infant seats (RFIS). While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

Automotive manufacturers and NHTSA are searching for methods to disable air bags in situations where they may cause more harm than good. Airbags have been developed to open with enough force to restrain a 175 lb. adult in a high velocity crash. When these air bags are deployed on children in the front passenger seat of a vehicle, they may cause serious injuries. Another potentially harmful situation is when the occupant is very close to the air bag inflator module at the time of air bag deployment. Recent NHTSA data suggests that severe injuries due to this close proximity with the inflator can be reduced or eliminated if the air bag is disabled when the occupant is closer than approximately four to ten inches from the inflator door. The region proximate to air bag inflator where the occupant could be at risk of injury from the air bag is called the "at-risk" zone. The size of the at-risk zone is dependent upon the inflation characteristics of the associated air bag inflator and the velocity of the occupant with respect to the air bag module. Previous studies had suggested that the at-risk zone extended about eight inches from the inflator door.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at greater risk for injury when exposed to higher severity crashes.

Another technique for mitigating injury to occupants by the air bag inflator is to control the rate of inflation rate or the capacity of the inflator responsive to a measure of the severity of the crash. The prior art teaches the use of multi-stage inflators having distinct independent compartmentalized stages and corresponding firing circuits, whereby the stages may be fired in delayed succession to control the effective inflation rate, or stages may be inhibited from firing to control the effective inflator capacity. The prior art also teaches the use of a hybrid inflator having a combination of stored gas and plural pyrotechnic gas generator elements which are independently fired. Furthermore, the prior art also teaches the use of control valves for controlling the gaseous discharge flow from the inflator. The inflation rate and capacity may be controlled responsive to the sensed or estimated severity of the crash, whereby a low severity would require a lower inflation rate or inflation capacity than a high severity crash. Since lower severity crashes are more likely than those of higher severity, and since such a controlled inflator would likely be less aggressive under lower severity crash conditions than those of higher severity, occupants at risk of injury by the air bag inflator because of their size or position will be less likely to be injured overall because they are more likely to be exposed to a less aggressive inflator. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the inflator responsive to the presence and position of the occupant, thereby activating the inflator only when an occupant is positioned outside the associated at-risk zone of the inflator. Recent NHTSA data suggests that severe injuries due to close proximity with the inflator can be reduced or eliminated if the air bag is disabled when the occupant is closer than approximately 4 to 10 inches from the inflator door. Such a system for disabling the air bag inflator requires a occupant sensor that is sufficiently sensitive and robust to make such a determination, while not causing the air bag inflator to be disabled when otherwise required for providing occupant restraint.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. The prior art teaches various means for detecting the presence of an occupant, or the recognition of an inanimate object in the passenger-seat of a vehicle for purposes of implementing such a system. For example, weight sensors can incorporated into the seat to detect the presence of an occupant.

Yet another technique for mitigating injury to occupants by the air bag inflator is to control the inflation rate or inflation capacity of the air bag inflator responsive to presence and position of an occupant. Such a control system would most preferentially be used in conjunction with a controllable inflation system responsive to crash severity, such as described above, wherein the occupant position inputs can be used to override otherwise overly aggressive air bag inflator controls which might otherwise be indicated by the particular crash severity level but which could be injurious to occupants of small stature or weight, or to infants in rear facing infant seats. Such a system for controlling the air bag inflator requires an occupant position sensor that is robust and sufficiently accurate, and that can distinguish and discriminate various occupant seating configurations and conditions.

The prior art teaches the use of sensors incorporated into the seat to detect the presence, weight, or seating position of the occupant. U.S. Pat. Nos. 3,672,699, 3,767,002, 5,161,820, 5,474,327, and 5,612,876 teach the use of occupant presence sensors incorporated into the seat to control the activation of the associated air bag inflator. U.S. Pat. No. 5,205,582 teaches a system for which the air bag inflator associated with an unoccupied seat is activated for accelerations above a second crash deceleration threshold, and otherwise deactivated. U.S. Pat. No. 5,074,583 teaches a plurality of sensors incorporated into the seat to detect occupant weight and seating position for purposes of controlling an air bag system. U.S. Pat. Nos. 5,232,243, 5,494,311, and 5,624,132 teaches an array of force sensing film elements incorporated into the seat for purposes of detecting the presence, weight, or position of an occupant for controlling either a multi-stage air bag inflator, an inflator vent valve, or the spatial orientation of the air bag inflator. U.S. Pat. No. 5,404,128 teaches the use of a vibration sensor incorporated into the seat to detect the subtle vibrations caused by the breathing and heart rhythms so as to determine whether or not a person is present. U.S. Pat. No. 5,573,269 teaches a means for correcting a seat weight measurement using seat back inclination angle and foot location. For some systems which incorporate seat weight as means for controlling the activation of an air bag inflator, the air bag inflator is required to be disabled if the sensed occupant weight is less than 30 Kg in order to assure that the air bag inflator is enabled for a fifth percentile female, but disabled for an infant in a rear facing infant seat. In some cases, as for example when the seat belt securing the infant seat is pulled too tight, an associated seat weight sensor could sense an apparent weight greater than the associated cut-off threshold so as to incorrectly enable the air bag inflator when a rear facing infant seat is present.

U.S. Pat. Nos. 5,071,160 and 5,118,134 teach the combination of sensing occupant position and/or velocity, and vehicle acceleration for purposes of controlling an inflator. Both of these patents teach by example the use of ultrasonic ranging to sense occupant position. U.S. Pat. No. 5,071,160 also teaches by example the use of a passive infrared occupant position sensor, while U.S. Pat. No. 5,118,134 teaches the use of a microwave sensor. U.S. Pat. No. 5,398,185 teaches the use of a plurality of occupant position sensors in a system for controlling safety restraint actuators in response thereto.

The prior art teaches the use of one or more ultrasonic beams reflected off the surface of an object to sense the location of the surface of the object. U.S. Pat. No. 5,330,226 teaches the combination of an ultrasonic ranging sensor mounted in the instrument panel and an overhead passive infrared sensor to sense occupant position for controlling a multi-stage air bag inflator or a vent valve connected thereto. U.S. Pat. Nos. 5,413,378, 5,439,249, and 5,626,359 teach the combination of ultrasonic sensors mounted in the dash and seat in combination with other seat sensors to detect the position and weight of the occupant for purposes of controlling an air bag inflator module. U.S. Pat. No. 5,482,314 teaches the combination of ultrasonic and passive infrared sensors together with associated signal processing for purposes of determining whether or not to deactivate a passive restraint system. U.S. Pat. Nos. 5,653,462 and 5,829,782 teach systems for identifying and monitoring the contents of a passenger compartment by illuminating an object with a wave generator that directs waves towards the vehicle seat, and processing the received signal with a neural network or other pattern recognition system. Furthermore, U.S. Pat. No. 5,653,462 illustrates a system wherein the wave signal is first reflected off the windshield before reaching the vehicle seat.

The prior art also teaches the use of infrared beams reflected off the surface of an object to sense the location of the surface of the object. U.S. Pat. Nos. 5,446,661, and 5,490,069 teach an infrared beam directed by a transmitter at a point of reflection on the object. A receiver detects the radiation scattered from the point of reflection, and measures the distance of the point of reflection from the transmitter based upon a triangulation of the transmitted and received beams for purposes of controlling the activation of a safety restraint system. These patents also teach the combination of an infrared beam occupant position sensor with an acceleration sensor for purposes of controlling an air bag inflation system. U.S. Pat. No. 5,549,322 teaches the incorporation of a light beam occupant sensor into an air bag door. Furthermore, infrared beam sensors are commonly used as range-finders in automatic focusing cameras.

The prior art of U.S. Pat. Nos. 4,625,329, 5,528,698, and 5,531,472 teach the use of imaging systems to detect occupant position, the later two of which use this information for purposes of controlling an air bag inflator. U.S. Pat. Nos. 5,528,698, 5,454,591, 5,515,933, 5,570,903, and 5,618,056 teach various means of detecting the presence of a rear facing infant seat for purposes of disabling an associated air bag inflator.

The prior art also teaches the use of capacitive sensing to detect the presence, proximity, or position of an occupant. U.S. Pat. No. 3,740,567 teaches the use of electrodes incorporated into the base and back of the seat respectively, together with a capacitance responsive circuit, for purposes of discriminating between human occupants and animals or packages resting on an automobile seat. U.S. Pat. No. 3,898,472 teaches an occupant detection apparatus which includes a metallic electrode which is disposed to cooperate with the body of an automobile to form an occupant sensing capacitor, together with related circuitry which senses variations in the associated capacitance responsive to the presence of an occupant. U.S. Pat. No. 4,300,116 teaches the use of a capacitive sensor to detect people proximate the exterior of a vehicle. U.S. Pat. No. 4,796,013 teaches a capacitive occupancy detector wherein the capacitance is sensed between the base of the seat and the roof of the vehicle. U.S. Pat. No. 4,831,279 teaches a capacity responsive control circuit for detecting transient capacitive changes related to the presence of a person. U.S. Pat. Nos. 4,9870,519 and 5,214,388 teach the use of an array of capacitive sensors for detecting the proximity of an object. U.S. Pat. No. 5,247,261 teaches the use of an electric field responsive sensor to measure the position of a point with respect to at least one axis. U.S. Pat. No. 5,411,289 teaches the use of a capacitive sensor incorporated into the back rest of the seat to detect occupant presence. U.S. Pat. No. 5,525,843 teaches the use of electrodes incorporated into the base and back of the seat for purpose of detecting the presence of an occupant, whereby the electrodes are substantially insulated from the vehicle chassis when the detection circuit is active. U.S. Pat. No. 5,602,734 teaches an array of electrodes mounted above the occupant for purposes of sensing occupant position based upon the influence of the occupant on the capacitance amongst the electrodes.

The prior art teaches systems—used alone or in combination—for suppressing the passenger air bag in dangerous situations. These systems incorporate various sensing technologies, for example:

Active infra-red sensors

Passive infra-red sensors (heat detectors)

Ultrasonic sensors

Capacitive sensors

Weight sensors (including various sensor technologies and measurement methods)

Child seat "tag" sensors

Vision-based systems

An objective of these sensors is to determine when an occupant is very close to the inflator door and in the path of the deploying air bag, particularly out-of-position occupants and rear facing infants. Once detected, these systems need to employ the correct airbag deployment strategy such that the passenger side airbag is disabled when a rear facing infant seat is present, or when a person is within a specified region near the inflator door at the time a crash occurs. A complicating situation for the sensor is when there is an object, but no part of the occupant in the at-risk zone. Usually the air bag could still be beneficial for the occupant, especially if the object in the at-risk zone is a low density or low mass object like a newspaper or a map. Systems that only use ultrasonic and optical sensing mechanisms can be blocked by newspapers. Ultrasonic sensors in some configurations will be affected by environmental conditions (temperature, humidity, altitude) because the speed of sound changes depending on the environment. Any sensing system that needs a clear line of sight between the sensor and the occupant requires the sensor to be visible to the occupant.

Radar systems can be used to measure the range to an object; however, there is a perception that biological tissue may be adversely affected by the continuous exposure thereof to a radar beam.

Usually two or more of these sensors are used together in an attempt to identify child seats, small occupants, empty seats, large occupants and out-of-position occupants. The more sensors that are used, the better the chance for a high performance system. The costs of systems that use many sensors however, can become prohibitively high because of the large number of components and the increased assembly complexity of the vehicle. Sensors which measure the distance between a point of reference and the surface of an object, such as ultrasonic or infrared beam sensors, are also vulnerable to false measurements, as would be caused for example by the presence of the extremities of an occupant, or by the presence of an object such as a scarf or newspaper held thereby, in proximity to the sensor. These types of sensors could be used to monitor the at-risk zone proximate the inflator door, but are subject to several disadvantages. In particular, infrared based systems usually incorporate a beam much narrower than the volume of the at-risk zone such that multiple beams may be required to reliably sense an object anywhere inside the at-risk zone. The incorporation of multiple beams results in extra cost, complexity, and potentially slowed response. Furthermore, both infrared beam and ultrasonic base sensors would require a significant amount of hardware proximate the inflator door if the at-risk zone proximate the inflator is to be monitored.

One disadvantage of many occupant detection systems is that they do not gather the most relevant information to determine if the occupant is in an at-risk zone around the inflator module. Occupant detection systems that are mounted above the passenger and look down on the seat area have the wrong physical perspective to directly monitor the region around the inflator door. Even if an ideal set of roof mounted sensors can reliably determine the occupant's gross position—which is a very challenging task, —the actual volume between the inflator door and the occupant may be blocked to the sensors by the occupant's body. If the criteria for controlling the activation of an air bag inflator were in part based on the proximity of the occupant's body to the air bag inflator door, then overhead sensors simply cannot reliably obtain the relevant information.

Some prior-art occupant detection systems attempt to identify the type of occupant or object in the passenger side seat, for example to discriminate a rear facing infant seat from a normally seated adult in the passenger seat. However, this is generally a very challenging task as there are a large variety of possible situations. Sensor systems that depend upon distance measurements to identify occupant situations generally use information from a relatively small number of points in space for identifying the particular type of occupant in the seat from amongst many possibilities. Results from these systems can be unreliable because a particular situation can be significantly changed by simple and common acts such as tossing a blanket over the occupant. Systems than can distinguish the occupant situation may be limited by the inability to disable the air bag during a pre-impact braking event. Moreover, the algorithms used in those systems are sometimes so complex that performance is sometimes unpredictable. While complex algorithms can sometimes makeup for the lack of direct sensory information, the same algorithms can sometimes create performance anomalies.

Systems that make distance measurements to locate the position of an object in space relative to a fixed position are known in the prior art. Some occupant detection systems have used time-of-flight distance measurements from ultrasonic or infrared sensors to locate occupants. Heretofore, occupant detection systems generally operated by detecting the location of the occupant in the passenger seat without knowing the orientation of the seat with respect to the vehicle or instrument panel. However, information such as the seat track position and seat back angle can be useful for augmenting existing occupant detection system that only sense occupant features. Generally, prior art devices for measuring the position of the seat depend upon mechanical devices in the seat. One problem with mechanical sensors is that they are susceptible to mechanical shock and are prone to mechanical deformation. Furthermore, the seat has to be custom-designed to fit the mechanical apparatus in the seat without reducing comfort to the occupant of the seat.

SUMMARY OF THE INVENTION

The instant invention overcomes the above-noted problems by providing a system and method for measuring the position of the seat back, and for sensing the region immediately in front thereof. The instant invention further provides for detecting a human body part that is within the at-risk zone of the inflator at the time of impact so that the air bag can be disabled or the inflation rate thereof can be reduced responsive thereto. The instant invention can be used to disable the passenger air bag in nearly all situations where the air bag can be a hazard. The instant invention also provides a system and method for measuring the seat track position and the seat back angle, wherein these measurements can be used to compensate other sensors that are affected by these variables.

In accordance with a first aspect, the instant invention comprises of two subsystems: an occupancy sensing subsystem for identifying whether there is a normally seated, forward facing occupant in the seat; and a range/proximity sensing subsystem for sensing subsystem for measuring the distance or proximity of an occupant relative to the air bag inflator door.

The occupancy sensing subsystem first identifies the position of the seat back and then senses the region in front of the upper seat back with a ranging device. A characteristic of a forward facing occupant is that there is a significant object, usually the occupant's head and shoulders, in front of the upper seat back. Accordingly, the air bag inflator is enabled only when an object is sensed having the same characteristics of as forward facing occupant.

The occupancy sensing subsystem first identifies the location of the seat back by using time of flight measurements between a fixed location in the vehicle interior and the seat back itself. Once the seat back position is determined, a ranging device mounted above the passenger seat measures the distance to the upper seat back. In cases when either the passenger is significantly out of position, the seat contains a RFIS, or when the seat is empty, the distance to the upper seat back is not the same as when there is a normally seated forward facing occupant in the seat. The system effectively acts like a switch, disabling the air bag until a forward facing occupant is identified. If the distance to the seat back is different than what would be expected if the seat were empty, a forward facing occupant is detected and the air bag is enabled. If the distance to the seat back is the same as what might be expected when the seat is empty, the air bag is disabled.

The range/proximity sensing subsystem comprises a ranging sensor that monitors the volume of space immediately around the air bag inflator door. The ranging sensor works independently of the transmitter/receiver subsystem and disables the air bag if an occupant's body is too close to the air bag inflator door at the time of impact.

The range/proximity sensing subsystem detects the presence of the passenger near the inflator in a short enough time period to disable the air bag while the passenger is still "flying" through the air during this pre-impact braking event, using for example, either a capacitive sensor, an optical range finder, an ultrasonic range finder, a radar or any other device that can detect the range between the inflator door and the occupant. If the sensor is located on, or very near to, the inflator door itself, the at-risk zone can be constantly monitored. The response of the sensor is sufficiently fast to disable the air bag if the occupant enters an at-risk zone immediately prior to the impact, which could happen during pre-impact braking.

The occupancy sensing subsystem can be adapted so as to be activated responsive to either a crash sensor or the range/proximity sensing subsystem, so as to reduce power consumption, extend the lifetime of the associated sensors, or reduce exposure of occupants to associated radiation from an associated transmitter. Alternately, both the occupancy sensing subsystem and the range/proximity sensing subsystem can be adapted so as to be activated responsive to a crash sensor.

In accordance with a second aspect, the instant invention provides a seat position sensing system comprising set of transmitters and receivers containing at least one transmitter and at least one receiver and a total number of transmitters and receivers of at least three. The transmitters transmit wave energy—preferably RF electromagnetic energy—to an associated receiver. Of this set, at least two like elements—transmitters or receivers—are disposed on or within the vehicle seat so as to be responsive to each of the degrees-of-freedom of seat track position and seat back angle to be measured. For example, in an elementary two degree-of-freedom system, the measurement of the position of the seat along the seat track, and the angle of the seat back requires a minimum of either two like elements in the seat back, or one element in the seat back and a like element in the seat base. For example, such a system could comprise a transmitter fixed to the vehicle interior, and either two receivers disposed at distinct locations within the seat back or one receiver in the seat back and another in the seat base. Alternately, a receiver could replace the transmitter, and transmitters could replace the receivers. The distance between each transmitter/receiver pair is determined from associated time-of-flight measurements of the associated wave energy propagating therebetween, and the associated seat track position and seat back angle is found by solving an associated set of characterizing simultaneous equations or behavioral relationships. Separate transmitter/receiver systems can utilize a common type of wave energy, with common or different carrier frequencies or signal encoding; or different types of wave energy. The second aspect of the instant invention provides a system and method for electronically sensing seat track position and seat back angle—without requiring mechanical devices which can be degraded by deformation and which are generally less reliable.

In one particular embodiment, the seat position sensing system comprises a pair of distinct transmitter/receiver subsystems, one of the pair of transmitter/receiver subsystems measuring the distance between a fixed point in the interior, rearward and upward of the seat, and a first point in the seat back near the top of the seat back, the other of the pair of transmitter/receiver subsystems measuring the distance between a fixed point in the interior, forward and upward of the seat, and a second point in the seat back that is displaced from the first point. The distance measurements from the pair of transmitter/receiver subsystems are characterized as a function of seat back angle for each seat track position, and then, in operation, a particular seat track position and seat back angle is determined from the associated distance measurements using these a priori characterizations by determining a set of seat back angles corresponding to the possible seat track positions from one of the distance measurements, then calculating what the second distance measurement would be for each of these angles at each respective seat track position, and finally determining the seat track position—having a corresponding seat back angle—that minimizes the error between the calculated and measured second distance measurement.

Additional degrees of freedom of the seat, as provided by adjustments for seat height or seat base angle, could either be treated as noise variables or sensed with additional transmitter/receiver elements, such that the number of linearly independent and controllable ranging vectors between associated transmitter/receiver elements is equal to the number of degrees of seat control motion to be measured.

The measurement of seat track position and seat back angle provides useful information that can be used to augment other occupant systems that may be sensitive to these variables. Preferably, and ideally, occupant detection systems are independent of the seat track position and seat back angle. However, some sensors used in occupant detection systems may be affected by the position of the seat and the angle of the seat back, for example ranging sensors for detecting seat occupancy or vision sensors that need to know the position of the seat back in order to avoid falsely detecting the seat back as an occupant. Accordingly, the seat track position and seat back angle provided by the second aspect of the instant invention can be used to augment and/or compensate measurements from the sensors used in these other occupant detection systems. For example, in systems that detect occupant using hydrostatic weight sensors in the seat base and the seat back, if the hydrostatic weight sensors incorporate liquid as the sensing fluid, the head pressure thereof in the hydrostatic weight sensor can influence the apparent weight sensed. If this head pressure is responsive to the seat back angle, then the seat back angle measurement from the second aspect of the instant invention can be used to compensate for the effects of seat back angle on the weight measurement from the associated hydrostatic weight sensor. In another example, the seat track position and seat back angle can be used to calculate the distance from the seat back to the instrument panel, which in conjunction with a ranging sensor that measures the distance from the vehicle interior to the seat back—that would be responsive to the front profile of an occupant, can be used to determine if an occupant is seated in the vehicle seat.

The transmitter/receiver elements include but are not limited to sonic, ultrasonic, radar, RF pulse transmission, laser, and infrared technologies that incorporating either electromagnetic or acoustic wave energy, and by which the distance between the transmitter and the receiver can be made by transmitting a wave from the transmitter, receiving the wave with the receiver, and measuring one or more characteristics of this process, such as wave transit time, to determine the distance between the transmitter and the receiver. The transmitter and receiver elements are adapted to operate in an automotive environment. The locations of these elements within the vehicle is generally dependent upon the interior design of the vehicle, and can vary from vehicle to vehicle, and are selected to minimize blockage in the course of normal vehicle operation, and to provide acceptable position and angle measurement accuracy. The range measurements between associated transmitters and receivers is processed by a signal processor—as for example incorporated in an embedded system—in accordance with an algorithm so as to provide a resulting measurement of seat track position and seat back angle.

The instant invention can be incorporated in any vehicle seat, as for example in systems for detecting out-of-position drivers or out-of-position passengers, and for disabling the associated air bag inflator if the driver or passenger is out-of-position so as to prevent an air bag induced injury.

Accordingly, one object of the instant invention is to provide an improved occupant position sensing system, which when incorporated into an occupant restraint system reduces the risk of injury to occupants by the associated air bag inflator.

A further object of the instant invention is to provide an improved occupant detection system that can determine if an occupant is positioned within the at-risk zone of the air bag inflator.

A further object of the instant invention is to provide an improved occupant detection system that can determine if an occupant is positioned proximate to the seat back.

A further object of the instant invention is to provide an improved occupant detection system that can determine if an occupant is positioned intermediate to the seat back and the air bag inflator.

A yet further object of the instant invention is to provide an improved occupant detection system that can sense rear facing infant seats.

The system of the instant invention disables the air bag if no forward facing occupant is detected, or if the forward facing occupant is too close to the inflator module.

The instant invention identifies the vehicle's seat back position before it attempts to correlate any distance measurement with the seat occupancy configuration. While other systems make range measurements from points in the vehicle interior to the seat back, they don't know the actual position of the seat back. This means that there is potential overlap between the distance to the empty seat in a forward position and the distance to a forward facing occupant when the seat is adjusted back. This invention determines the position of the seat back and therefore always knows the distance to the empty seat.

Furthermore, the instant invention provides a method of determining the position of the seat back. Instead of actually making measurements of the mechanical position of the seat back at the seat track and the pivot point of the seat back, this invention uses the time of flight for an electromagnetic or acoustic pulse traveling between a fixed point in the vehicle and the seat back to identify the position of the seat back. This allows the components of the instant invention to be isolated from the mechanical components of the seat. Furthermore, the seat position measurement and occupancy sensing systems can be combined so that similar components are shared between the systems so as to reduce cost and complexity, and to increase reliability and functionality.

These and other objects, features, and advantages of the instant invention will be more fully understood after reading the following detailed description of the preferred embodiment with reference to the accompanying drawings and viewed in accordance with the appended claims.

DETAILED DESCRIPTION OF THE PREFERRED EMBODIMENT(S)

Figure 1:
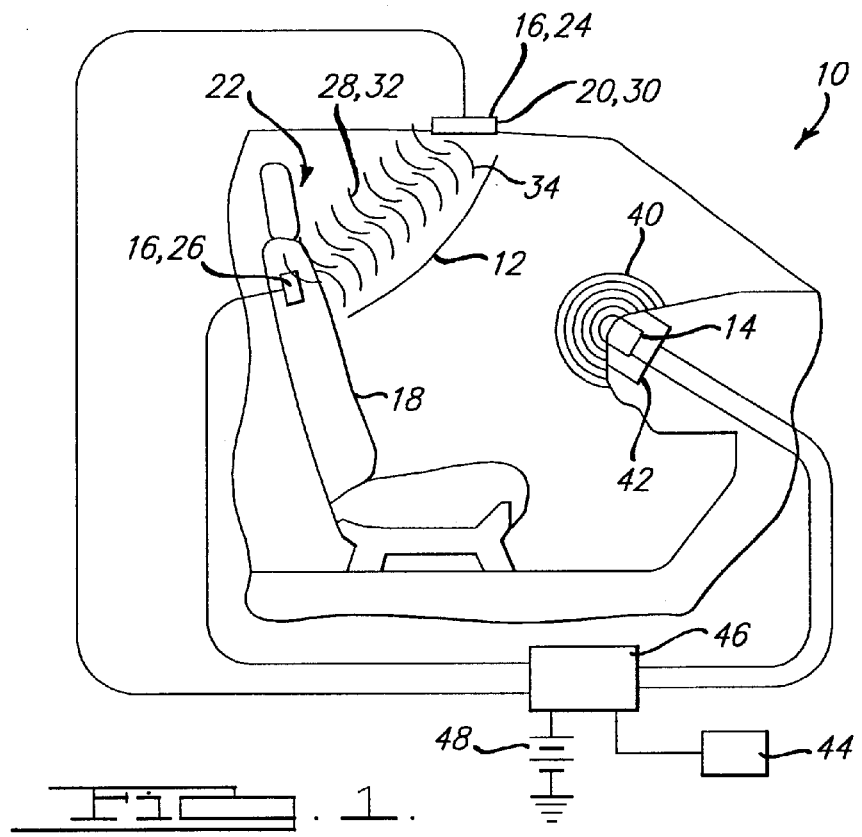
FIG. 1 illustrates the instant invention incorporated in the passenger-side of a vehicle with an empty seat, in accordance with a first embodiment.

Referring to FIG. 1, an occupant detection system 10 comprises an occupancy sensing subsystem 12 and a range/proximity sensing subsystem 14. The occupancy sensing subsystem 12 comprises a transmitter/receiver subsystem 16 for sensing the position of the seat back 18 and a ranging subsystem 20 for sensing the front surface of the upper seat back 22, or an occupant or object located in front thereof. The transmitter/receiver subsystem 16 comprises a transmitter 24 and a receiver 26. The transmitter 24 is mounted at a fixed position in the vehicle's interior and transmits a signal—preferably a pulse of either electromagnetic (RF or light) or acoustic radiation—in the direction of the seat back 18. The receiver 26 is mounted in the seat back receives the signal. The system measures the distance from the transmitter 24 to the receiver 26, and accordingly the seat back position, from the time required for a signal 28 to propagate therebetween. Alternately, the positions of the transmitter 24 and receiver 26 may be reversed.

The transmitter/receiver subsystem 16 operates with any kind of wave energy—continuous or pulsed—that can be propagated between the transmitter 24 and the receiver 26, including acoustic—either audible or non-audible—and electromagnetic wave energy—either invisible or visible,—by which the distance between the transmitter 24 and the receiver 26 can be measured from characteristics of the propagated signal, such as the propagation time, phase shift, or frequency shift of a frequency modulated signal. For example, the transmitter/receiver subsystem 16 may comprise a micropower impulse radar, as for example taught by U.S. Pat. Nos. 5,589,838 or 5,661,490 which are incorporated herein by reference. Such systems are capable of relatively accurately measuring the distance to objects within 1–10 feet, and are capable of operating through fascia material, such as vehicle interior components.

Figure 3:
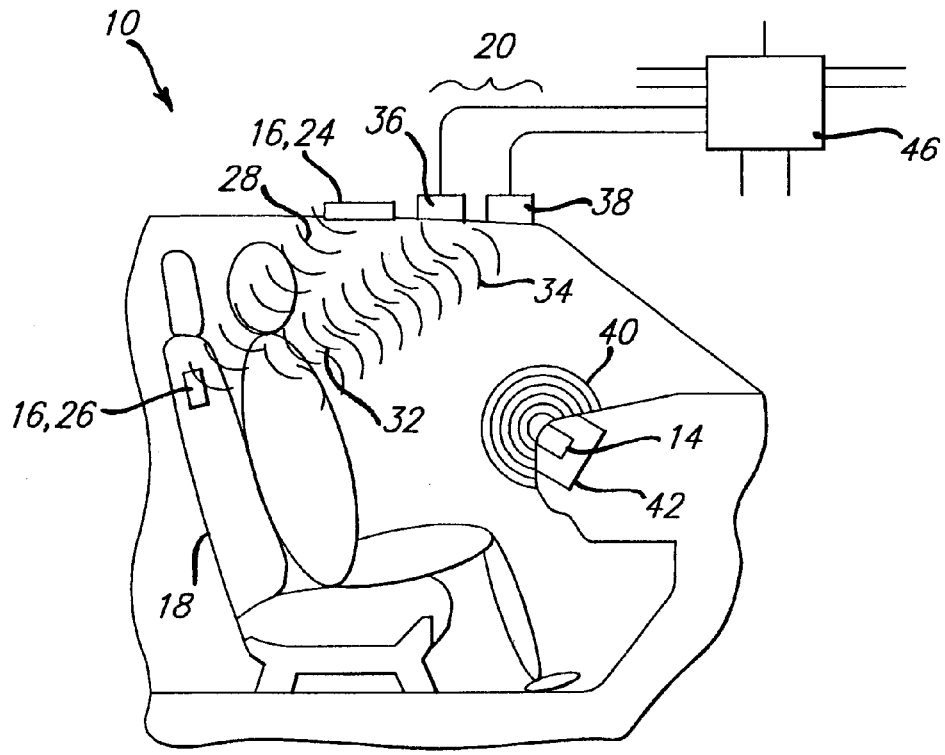
FIG. 3 illustrates the instant invention incorporated in the passenger-side of a vehicle with a normally seated occupant in the seat, in accordance with a third embodiment.

The ranging subsystem 20 measures the distance from a fixed point in the vehicle interior, such as for example a ceiling mounted module, to the closest object along the range finder's beam path such as the front surface of the upper seat back 22, or the occupant or object in front of the upper seat back 22. If the closest object is the seat back 18, as illustrated in FIG. 1, the distance measurements from the transmitter/receiver subsystem 16 using the time of flight measurement to the seat back 18 and the ranging subsystem 20 will be consistent. If there is a normally seated forward facing occupant, as illustrated in FIG. 3, the distance measurement from the ranging subsystem 20 will be significantly less than the distance to the seat back 18 from the transmitter/receiver subsystem 16. Alternately, with the transmitter located in the seat back, the ranging subsystem 20 measures the distance of the occupant from the seat back 18, which in conjunction with a separate measure of seat back position, provides a measurement of the position of the occupant within the interior of the vehicle. Preferably, the ranging subsystem 20 measures the distance to the occupant at a rate that is sufficiently fast to measure occupant position in real time responsive to typical occupant motion, for example as a result of pre-impact braking.

The ranging subsystem 20 incorporates a range finder utilizing acoustic, for example ultrasonic; optical, for example active infrared, or radar, for example pulsed or continuous wave electromagnetic technologies to make the range measurement by any of a number of known techniques including time of flight; phase shift; frequency shift, as in linear frequency modulate continuous wave (LFMCW) radar; or by triangulation. For example, the ranging subsystem 20 may incorporate a pulse mode or noise coded radar as taught by U.S. Pat. Nos. 5,589,838, 5,661,490, or 5,731,781, which are incorporated herein by reference. The measurement beam profile and beam path preferably is such that the upper region of the seat back 18 is monitored at any seat back position.

Figure 2:
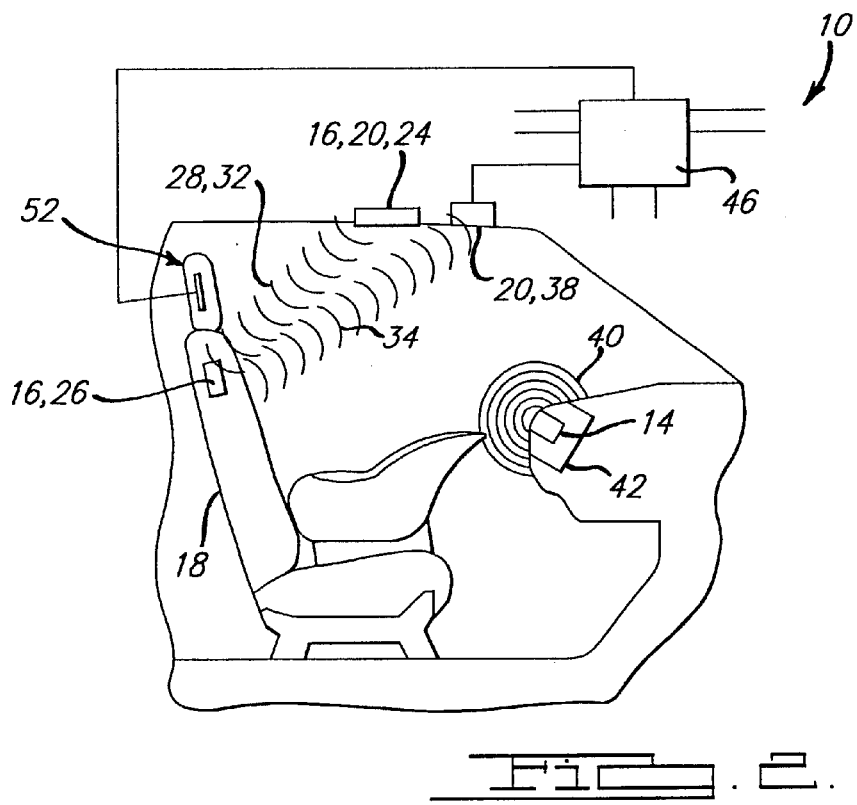
FIG. 2 illustrates the instant invention incorporated in the passenger-side of a vehicle with a rear facing infant seat (RFIS) on the seat, in accordance with a second embodiment.

In the embodiment illustrated in FIG. 1, the transmitter 24 of the transmitter/receiver subsystem 16 serves as a transceiver 30 of the ranging subsystem 20, wherein the incident signal 32 transmitted by the transceiver 30 is reflected by the seat, or object therein, thereby generating a reflected signal 34 that is received by the transceiver 30, wherein the range to the seat or object therein is measured from the transit time of the signal 32 from the transceiver 30 and the reflected signal 24 from and to the transceiver 30. The incident signal 32 can be the same as, or distinct from, the signal 28 of the transmitter/receiver subsystem 16. Referring to FIG. 2, in another embodiment, the ranging subsystem 20 and the transmitter/receiver subsystem 16 share a common transmitter 24, and the ranging subsystem 20 incorporates a second receiver 38 that is located proximate to the transmitter 24. Referring to FIG. 3, in yet another embodiment, the ranging subsystem 20 incorporates a second transmitter 36 and a second receiver 38, each located at a fixed point in the vehicle interior that is visible to the upper seat back 22. In this embodiment, the signals of the transmitter/receiver subsystem 16 and the ranging subsystem 20 are distinct, and accordingly these respective subsystems can incorporate different types of wave energy. For example, the transmitter/receiver subsystem 16 could incorporate an RF signal and the ranging subsystem 20 could incorporate an ultrasonic signal.

Alternately, the ranging subsystem 20 can also provide the position of the seat back 18—without requiring the transmitter/receiver subsystem 16 described hereinabove—by separately measuring the reflections from the seat back 18 and the reflection from an object or occupant located in front thereof. Furthermore, the seat back 18 may be adapted to provide a return signal having a novel signature to the range finder that is distinct from the returns of objects or occupants located on the seat, so as to provide for a means of distinguishing that component of returned signal that corresponds to the reflection from the seat back 18 from that component of the returned signal that corresponds to the reflection from an occupant or object within the seat.

The range/proximity sensing subsystem 14, comprising a range finding or proximity detecting device, determines if the occupant is within a predetermined at-risk zone 40 proximate to the air bag inflator 42. The range/proximity sensing subsystem 14 incorporates capacitive, ultrasonic, optical (including infrared, or vision based systems), or radar technologies, as for example taught in the prior art and by the patents and patent applications that are incorporated herein by reference.

Figure 6:
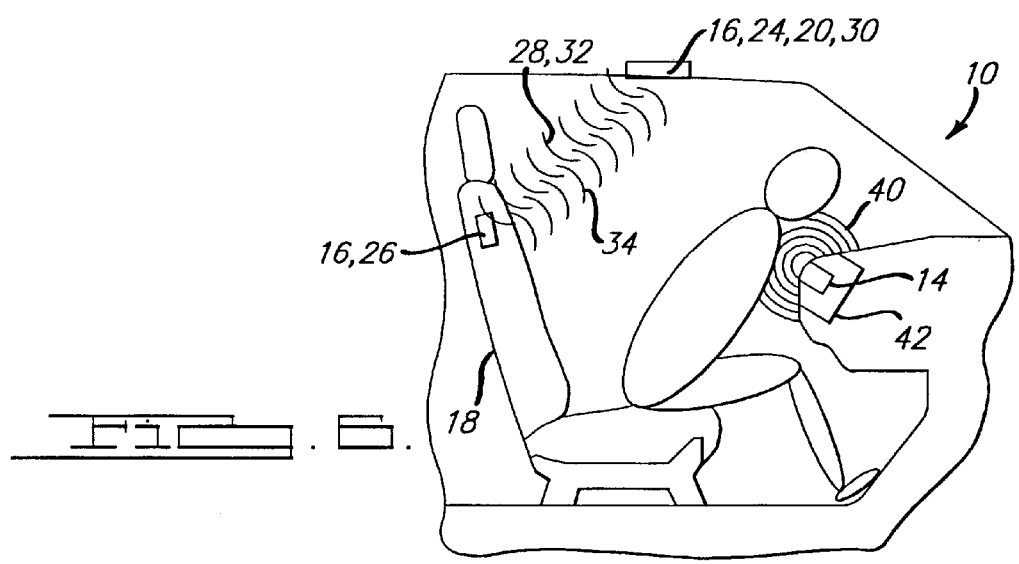
FIG. 6 illustrates the instant invention incorporated in the passenger-side of a vehicle with a substantially out-of-position forward leaning occupant in the seat wherein the occupant is proximate the at-risk zone of the air bag inflator.
Figure 7:
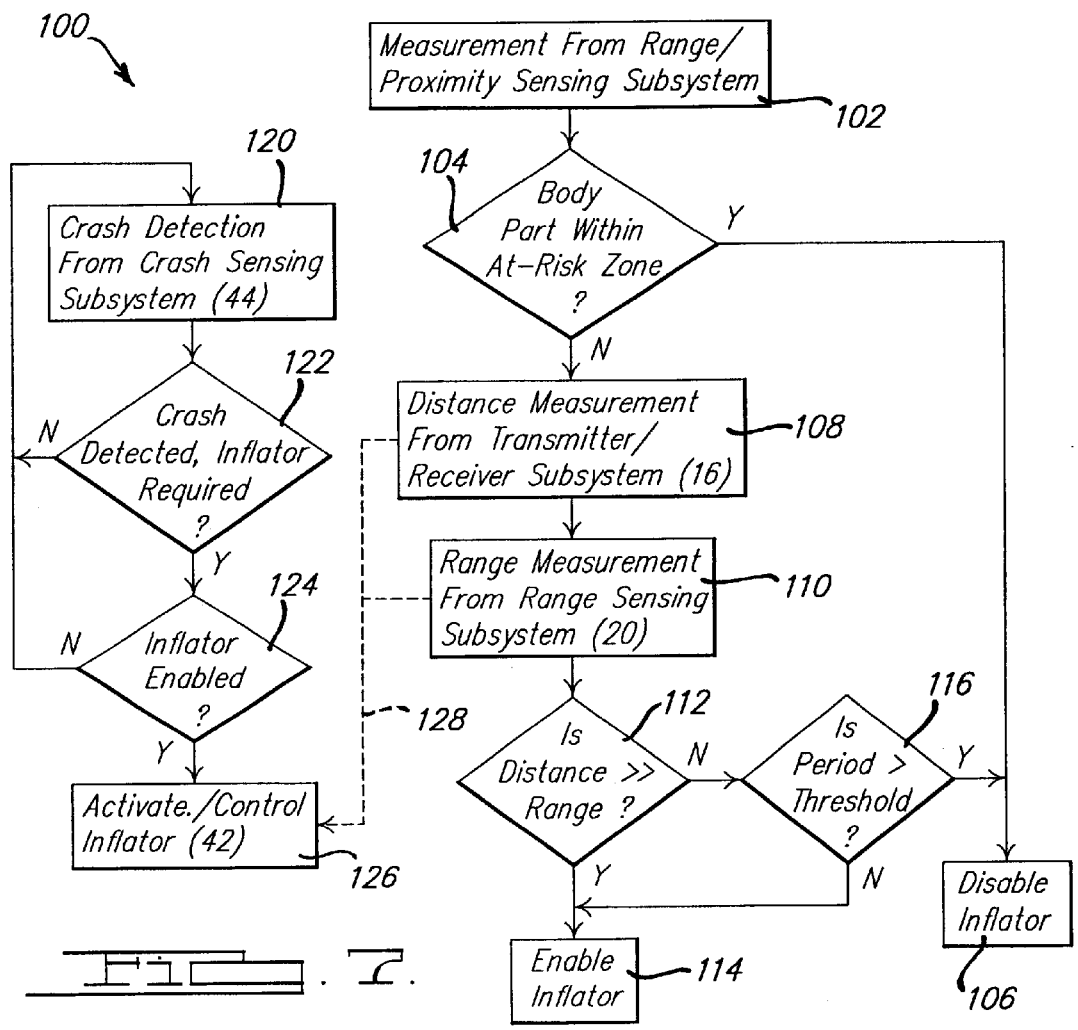
FIG. 7 illustrates a block diagram of occupant detection system logic in accordance with the instant invention.

The occupant detection system 10 determines whether the air bag will deploy by assessing if there is a human body seated against the seat back 18 or if a part thereof is very close to the air bag inflator 42. Referring to FIG. 7, the enable decision for the air bag inflator 42 is in accordance with following occupant detection system logic (100):

a. In step (104) if the measurement (102) from the range/proximity sensing subsystem 14 indicates that there is a body part too close to the air bag inflator 42, i.e. within the at-risk zone 40, then the air bag inflator 42 is disabled in step (106). This scenario is illustrated in FIG. 6. Alternately, the air bag inflator 42 is also disabled if an object such as a rear facing infant seat is detected within the at-risk zone 40, as is illustrated in FIG. 2.

b. Otherwise, in step (112) if the distance measurement (108) from the transmitter/receiver subsystem 16 is consistent with the range measurement (110) from the ranging subsystem 20 for a sufficient period of time in step (116), indicating that there is no forward facing occupant seated against the seat back 18, then the air bag inflator 42 is disabled in step (106). This scenario is illustrated in FIGS. 1, 2, 5, and 6. Alternately, under these circumstances, the air bag inflator 42 can be activated with a softened inflation characteristic responsive to the distance or range measurements (128).

c. Otherwise, if the range measurement (110) from the ranging subsystem 20 is significantly less than the distance measurement (108) from the transmitter/receiver subsystem 16, indicating an occupant seated against the seat back 18, then the air bag inflator 42 is enabled in step (114). This scenario is illustrated in FIGS. 3 and 4.

d. If in step (122) a crash is detected (120) by the crash sensing subsystem 44, and if in step (124) the inflator has been enabled from step (114), then the inflator is activated in step (126), alternately responsive to the distance and/or range measurements from steps (108) and/or (110).

Referring to FIG. 1, the occupancy sensing subsystem 12, the range/proximity sensing subsystem 14, the air bag inflator 42 and a crash sensing subsystem 44 are operatively coupled to a controller 46 powered by a source of power 48. If enabled by occupancy sensing subsystem 12 and the range/proximity sensing subsystem 14, the controller 46 activates the air bag inflator 42 responsive to a crash of sufficient severity as detected by the crash sensing subsystem 44. The air bag inflator 42 may comprise one or more inflator stages, wherein a multi-stage inflator provides for the control of the associated inflation characteristic by the controller 46. Referring to FIGS. 2 and 3, a second transmitter 36 or second receiver 38, if used, are also operatively coupled to the controller 46.

Figure 4:
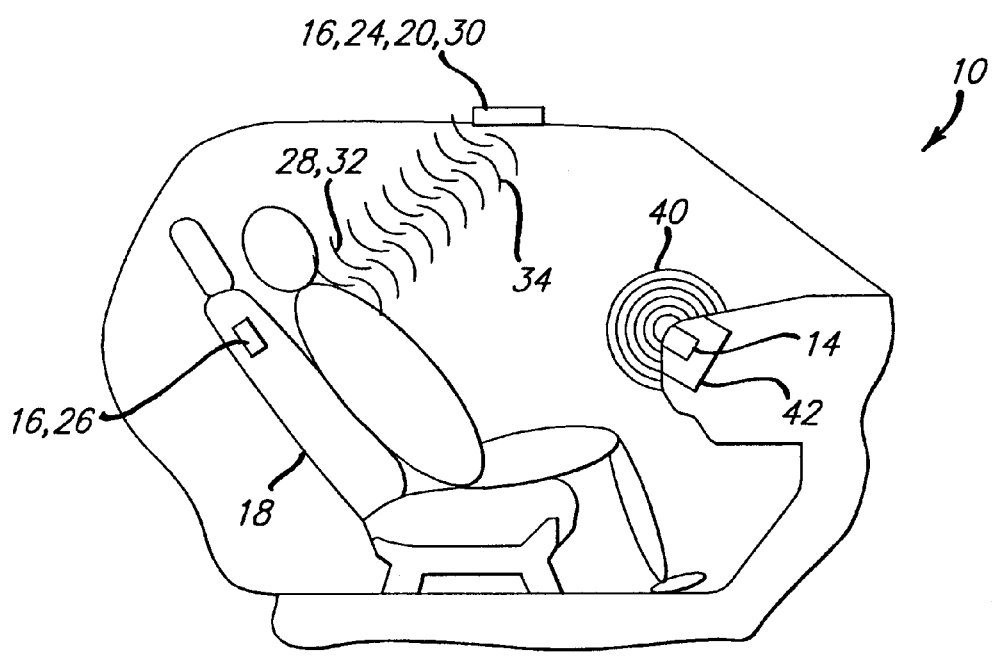
FIG. 4 illustrates the instant invention incorporated in the passenger-side of a vehicle with a rearward leaning occupant in the seat.

The occupant detection system 10 provides the appropriate enable decision for nearly all typical situations including situations for which the occupant is reclined back in the passenger seat, as illustrated in FIG. 4, or for which the occupant's head or torso are in the at-risk zone 40 of the air bag inflator 42, as illustrated in FIG. 6.

Figure 5:
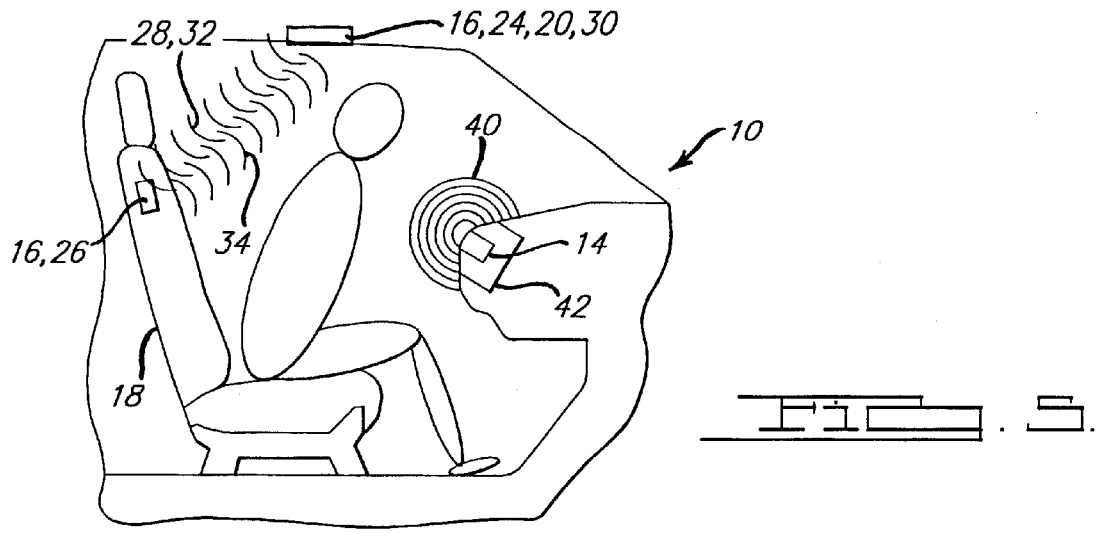
FIG. 5 illustrates the instant invention incorporated in the passenger-side of a vehicle with a forward leaning occupant in the seat.

Another situation that is possible, but less likely, occurs when the occupant is leaned forward, but not in the at-risk zone 40, as illustrated in FIG. 5. If this situation is only temporary, the air bag would stay enabled as long as the occupant is not detected in the at-risk zone 40. Alternately, for a safety restraint system with a controllable air bag inflator 42, the inflation characteristic may be softened. If this situation persists for many seconds, the system would either 1) be forced to assume that there is a rear facing infant seat and thus disable the air bag, or 2) activate the air bag inflator 42 with a softened inflation characteristic if the air bag inflator 42 is controllable.

The ranging subsystem 20 and range/proximity sensing subsystem 14 can incorporate ultrasonic transceivers, wherein ultrasonic pulses are transmitted by an ultrasonic transducer 50 and the reflections thereof from any target in the ultrasonic beam's path are received by the same ultrasonic transducer 50. The time between the transmission of a pulse and the reception of a corresponding reflected pulse corresponds to the distance to the object producing the reflection, if the speed of sound is known. One problem with automotive applications of ultrasonic range finders is that the speed of sound changes significantly with environmental conditions.

Temperature, humidity and altitude effect the speed of sound and therefore also effect range measurements made by an ultrasonic range finder. If the distance measurement from the transmitter/receiver subsystem 16 is accurate, then the variation in the range measurement from the ranging subsystem 20 due to variations in environmental conditions would need to be less than about +/−10%. Otherwise, an empty seat might appear to be closer than indicated by the distance measurement from the transmitter/receiver subsystem 16, which could result in and improperly enabled air bag when a RFIS is present or when an occupant is out-of-position.

Figure 8:
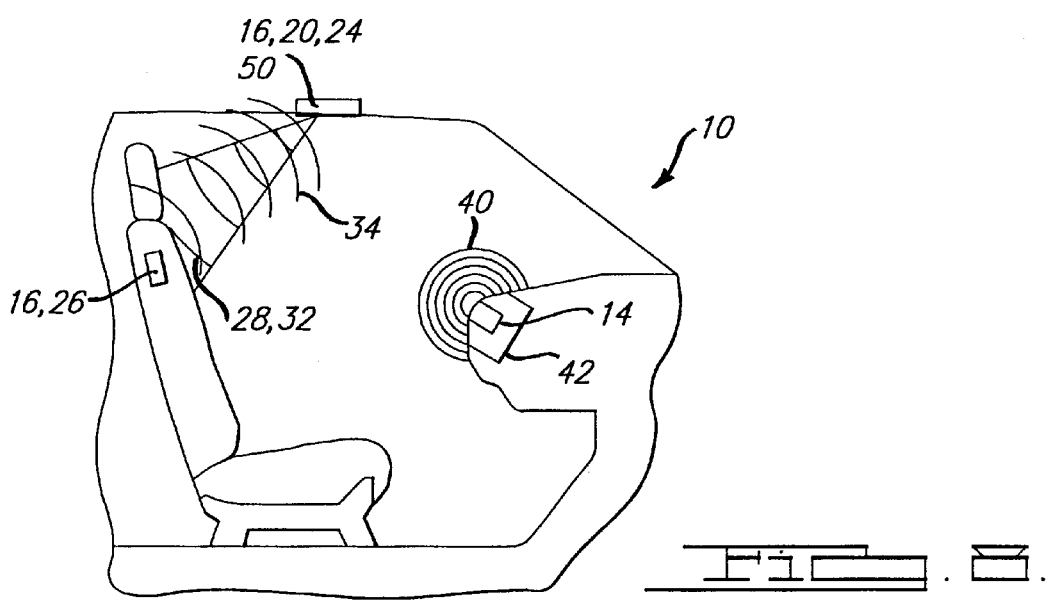
FIG. 8 illustrates the instant invention incorporating an ultrasonic sensor for measuring both the position of the seat back and the distance to the front surface of the upper seat back, or to an occupant or object located in front thereof.

Referring to FIG. 8, this problem can be substantially eliminated by using a common transmitter 24, an ultrasonic transducer 50, for the transmitter/receiver subsystem 16 and the ranging subsystem 20. Accordingly, the speed of propagation of the wave signal is common to both subsystems, so that both measurements are similarly effected by common environmental conditions. The ultrasonic transducer 50 is both a source of the ultrasonic pulse that is received by the microphone receiver 26 of the transmitter/receiver subsystem 16, and a source of the incident signal 32 of the ranging subsystem 20.

Accordingly, the occupancy sensing subsystem 12 is primarily dependent upon the difference in propagation time delays of the transmitter/receiver subsystem 16 and the ranging subsystem 20. In empty seat or RFIS situations, the time of flight from the ultrasonic transducer 50 to the receiver 26 would be about half the time required for a pulse travel to and reflect from the seat back 18 and to return to the ultrasonic transducer 50 (not including a small, constant offset that is dependent on the location of the receiver 26 in the seat back 18). If the time of flight from the ultrasonic transducer 50 to the receiver 26 is significantly more than half the time required for the pulse to reach an object and to return to the ultrasonic transducer 50, then the occupancy sensing subsystem 12 assumes that there is a forward facing occupant in the seat.

Preferably, the ranging subsystem 20 is located in the vehicle so that a RFIS with a tall shade cover or a blanket that extends into the sensing region near the upper seat back 22 is not detected as a forward facing occupant. An additional sensing system may be needed in some situations to assure the proper detection of all possible RFIS configurations. For example, referring to FIG. 2, a capacitive sensor 52 may be incorporated in the upper seat back 22, for sensing a dielectric mass near the upper seat back 22. If the ranging subsystem 20 identifies an object in front of the seat back 18, but the capacitive sensor 52 does not sense a dielectric mass near the upper seat back 22, then the occupancy sensing subsystem 12 assumes that there is no forward facing occupant. The capacitive sensor 52 in the seat back 18 could be effective by itself except for situations in which the seat becomes wet or there is a wet towel on the seat back 18, in which case the signal is similar to the signal seen when a forward facing occupant is in the seat. However, in combination, the combination of the capacitive sensor 52, the transmitter/receiver subsystem 16, and the ranging subsystem 20 substantially reduces the likelihood of an incorrect situation assessment. Furthermore, an electrode of the capacitive sensor 52 may also be used as a radar reflector in conjunction with the ranging subsytem 20 for measuring the position of the seat back 18.

Figure 9:
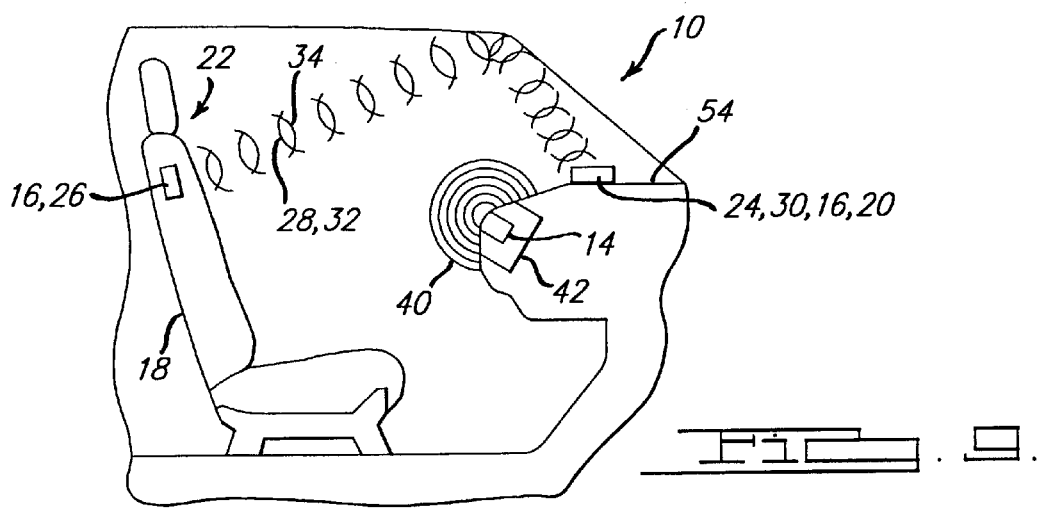
FIG. 9 illustrates the instant invention incorporating transmitter and receiver elements of the occupancy sensing subsystem in the instrument panel, wherein associated signals are reflected off the interior surface of the vehicle before being transmitted to or received from the vehicle seating area.

Referring to FIG. 9, the transmitter 24 of the transmitter/receiver subsystem 12 and the transceiver 30 (or second transmitter 36, second receiver 38, or ultrasonic transducer 50) of the ranging subsystem 20 alternately may be located on or in the instrument panel 54 so as to facilitate packaging, wherein the signal 28 from the transmitter 24 is first reflected off the vehicle interior (e.g. windshield) before reaching the receiver 26, as is the incident signal 32 from the transceiver 30, and the reflected signal 34 is first reflected off the vehicle interior before reaching the transceiver 30.

Figure 10:
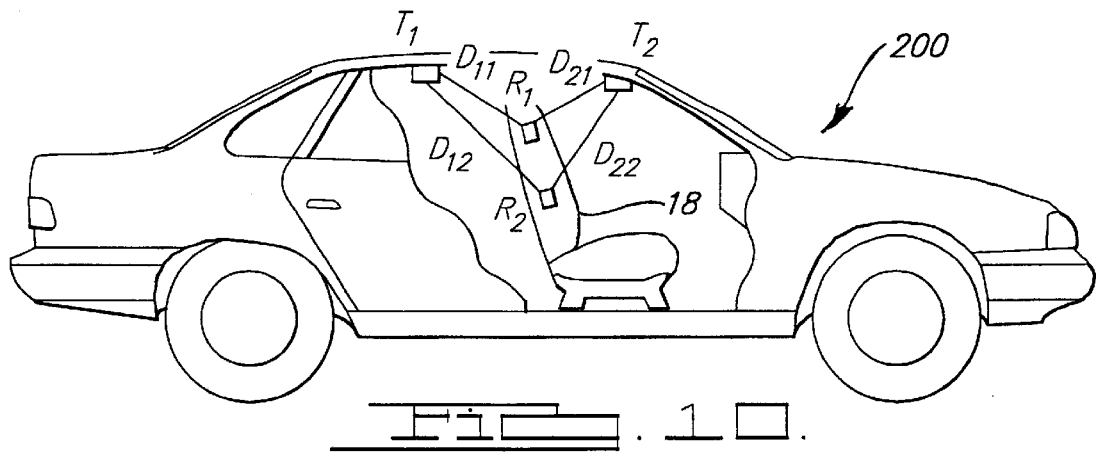
FIG. 10 illustrates elements of a second aspect of the instant invention.

Referring to FIG. 10, a seat position sensing system 200 comprises a plurality of transmitter/receiver subsystems arranged to provide a plurality of linearly independent distance measurements between the seat and the vehicle interior. The number of linearly independent distance measurements is at least as great as the number of degrees-of-freedom of seat motion to be accommodated. For example, in a seat with two degrees-of-freedom positioning comprising seat back angle and seat track location, at least two independent distance measurements to the seat are necessary to determine the seat back angle and the seat track location therefrom, wherein at least one of the distance measurements is affected by seat back angle, and at least one of the distance measurements is affected by seat track position, and the two measurements are affected differently by seat back angle and seat track position. The plurality of transmitter/receiver subsystems can either be distinct from one another, or can share transmitters 24 or receivers 26. For example, in FIG. 10, with transmitters T1 and T2, and receivers R1 and R2, four different pairs of transmitter/receiver subsystems could be used in a seat position sensing system 200, as follows: {T1/R1, T1/R2}; {T1/R1, T2/R2}; {T2/R1, T2/R2};and {T1/R1, T2/R1}.

The transmitter/receiver subsystems measure distance therebetween by measuring the propagation time of wave energy from the associated transmitters 24 to the associated receiver 26. Any kind of wave energy may be utilized, including but not limited to ultrasonic, infrared, RF pulses, and RADAR. Preferably, the speed of propagation is relatively unaffected by variations in environmental conditions within the automotive operating range, as is generally the case for electromagnetic pulses.

The transmitter 24 and receiver 26 of the transmitter/receiver subsystems are located so as to minimize the probability of blockage of the path between the transmitter 24 and the receiver 26 for more than a limited period of time. Transient blockage of any one of the sensors may be accommodated by a tracking algorithm.

Figure 11:
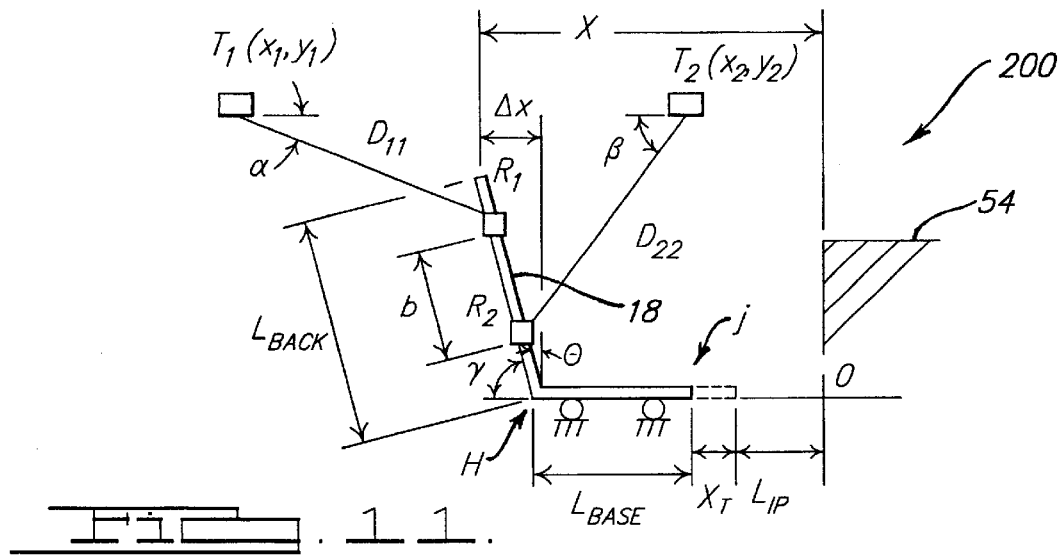
FIG. 11 illustrates the geometry of a first embodiment of the second aspect of the instant invention, for sensing the position of the seat.

Referring to FIG. 11, in accordance with a first embodiment of the second aspect of the instant invention, two distinct transmitter/receiver subsystems are provided. The first transmitter/receiver subsystem comprises transmitter $T_1$ located in the upper rear corner of the vehicle interior—on the same side as the seat to be monitored—and receiver $R_1$ located near the top of the seat back in the center thereof. The second transmitter/receiver subsystem $T_2/R_2$ comprises transmitter $T_2$ located in the vehicle interior near the roof next to the door—on the same side as the seat to be monitored—and receiver $R_2$ located in the seat back substantially below receiver $R_1$, wherein the transmitter $T_2$ pointing downwards towards receiver R2 such that a person leaning against the door does not block the patch between the transmitter $T_2$ and the receiver $R_2$ with the seat in full back position. The receivers $R_1$ and $R_2$ can be located at a variety of positions within the seat back 18. Transmitter/receiver subsystem $T_1/R_1$ provides distance measurement $D_{11}$, and transmitter/receiver subsystem $T_2/R_2$ provides distance measurement $D_{22}$.

Figure 12:
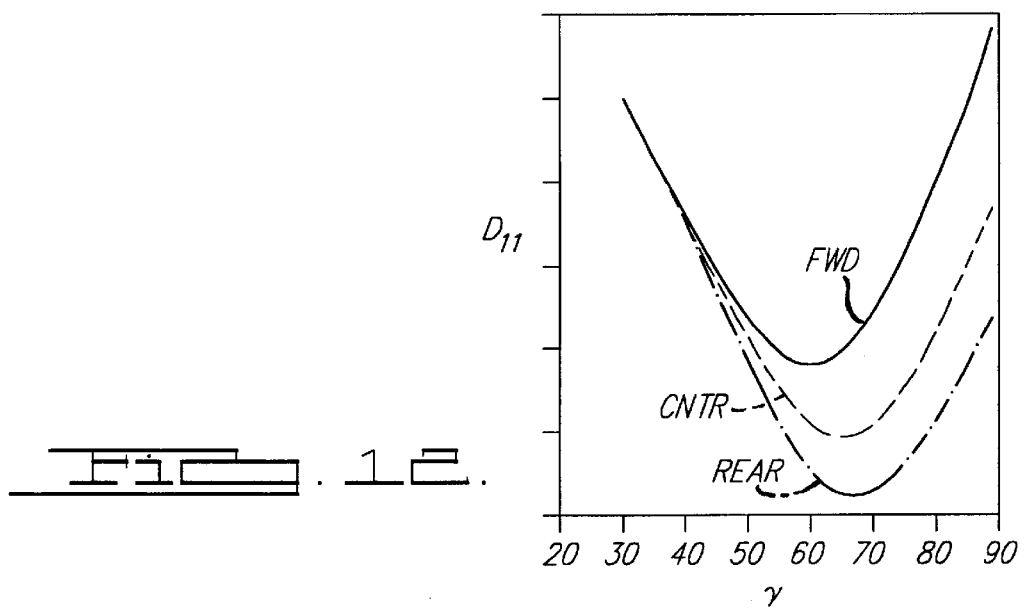
FIG. 12 illustrates the behavior of a first transmitter/receiver subsystem in accordance with the geometry of FIG. 11.
Figure 13:
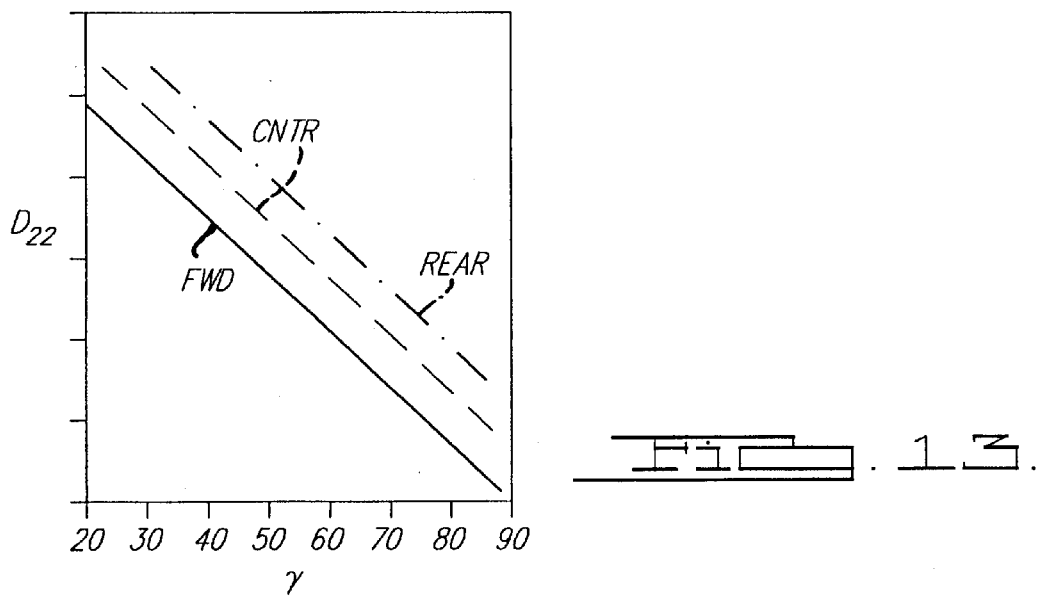
FIG. 13 illustrates the behavior of a second transmitter/receiver subsystem in accordance with the geometry of FIG. 11.

In accordance with FIG. 11, the seat position sensing system 200 further comprises an algorithm for determining the seat track position and seat back angle from the distance measurements $M_1\_D_{11}$ and $M_2\_D_{22}$. For a seat track with N discrete positions—representing the resolution to which the seat track position can be determined—for each seat track position j, with $\{j=1, 2, \ldots, N\}$ and each measurement $M_i$, a function $f_{i,j}(\gamma)$ is defined from $M_i$ as a function of seat back angle $\gamma$. For example, FIGS. 12 and 13 illustrate the functions $f_{1,j}(\gamma)$ and $f_{2,j}(\gamma)$ at the forward (FWD), center (CNTR) and rear (REAR) seat track positions, wherein $f_{1,j}(\gamma)$ and $f_{2,j}(\gamma)$ respectively represent fourth order curve fits of a priori measurements $M_1\_D_{11}$ and $M_2\_D_{22}$ at a plurality of seat angles $\gamma$. The transmitter/receiver subsystems preferably have unique well-defined distance behaviors as functions of seatback angle for each seat track position. That is, all of the distance behaviors for a transmitter/receiver subsystem preferably do not intersect between seat track positions. As illustrated in FIGS. 12 and 13, one useful characteristic is to locate the transmitter/receiver subsystems such that the one of the functions $f_{1,j}(\gamma)$ exhibits second order behavior, the other function $f_{2,j}(\gamma)$ exhibits first order behavior, for each of the seat track positions. In operation, given the respective distance measurements $M_i$, for i=$\{1, 2\}$, the algorithm finds the seat track position j=n that minimizes the following cost function:

$$(M_1 - f_{1,j}(f_{2,j}^{-1}(M_2)))^2$$

Where $$\gamma = f_{2,j}^{-1}(M_2)$$

Accordingly, this process provides values for seat track position j and seat back angle $\gamma$ from measurements $M_1$ and $M_2$. A form of conflict resolution may be required if for a given set of measurements, several different seat track positions j provide similar values for the cost function. The seat track position j provides an associated seat track distance $X_T$. Referring the FIG. 11, the distance X from the top of the seat back to the instrument panel is then given by:

$$X = L_{IP} + X_T + L_{Base} + L_{Back} \cdot \cos(\gamma)$$

Where $L_{IP}$ is the distance from the forward positioned seat to the instrument panel, $L_{Base}$ is the length of the seat base, and $L_{Back}$ is the length of the seat back.

Alternately, the seat track position j and seat back angle $\gamma$ can be found by minimizing the following cost function with respect to seat track position j=n:

$$(f_{1,j}^{-1}(M_1) - f_{2,j}^{-1}(M_2))^2$$

Figure 14:
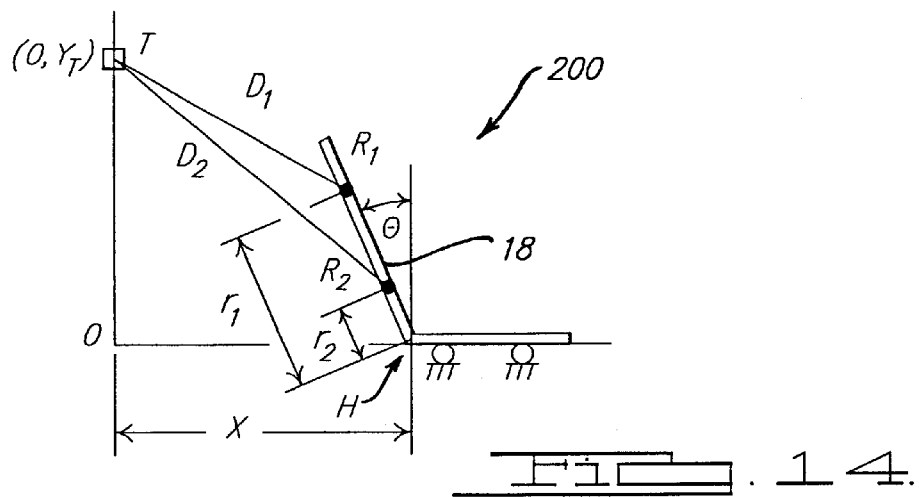
FIG. 14 illustrates the geometry of a second embodiment of the second aspect of the instant invention, for sensing the position of the seat.

Referring to FIG. 14, in a second embodiment of the second aspect of the instant invention, the two transmitter receiver subsystems may incorporate a common transmitter T with two receivers R1 and R2 that are displaced from one another in the seat back. Given two distance measurements $D_1$ and $D_2$, the seat back angle $\theta$ and seat track position x, relative to the transmitter T, can be found analytically by solving the following pair of simultaneous equations with respect to $\{x, \theta\}$, for i=$\{1,2\}$:

$$(x - r_i \sin\theta)^2 + (y_T - r_i \cos\theta)^2 = D_i^2$$

where $r_i$ is the distance from the seat back hinge point H to the respective receiver $R_i$ and $Y_T$ is the height of the transducer T above the seat back hinge point H, wherein the seat track is coincident with the X-axis.

Figure 15:
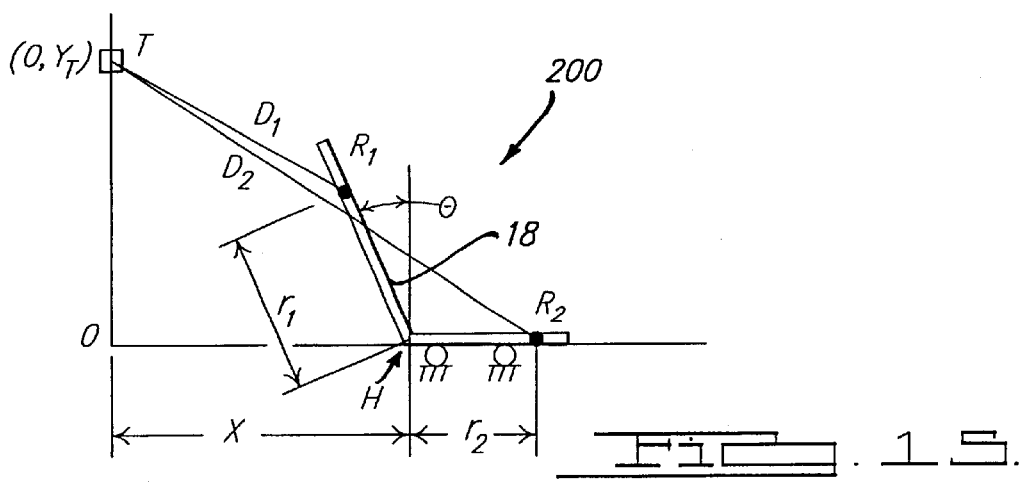
FIG. 15 illustrates the geometry of a third embodiment of the second aspect of the instant invention, for sensing the position of the seat.

Referring to FIG. 15, in a third embodiment of the second aspect of the instant invention, the two transmitter receiver subsystems may incorporate a common transmitter T with two receivers R1 and R2 located respectively in the seat back and the seat base. Given two distance measurement $D_2$, the seat track position x relative to the transmitter T is given by:

$$x = \sqrt{D_2^2 - y_T^2} - r_2$$

with the seat track constrained along the X-axis. The seat back angle $\theta$ is then found by solving:

$$(x - r_1 \sin\theta)^2 + (Y_T - r_1 \cos\theta)^2 = D_1^2$$

This embodiment, however, may be more sensitive to variations in seat height.

As illustrated for the embodiments of FIGS. 14 and 15, any of the embodiments of FIGS. 10 and 11 may be solved explicitly for seat track position and seat back angle using techniques of analytic geometry or mechanism analysis as known to one of ordinary skill in the art. For example, the embodiment of FIG. 11 can be treated as a four bar linkage with the added constraints that the seat back 18, upon which the receivers $R_1$ and $R_2$ are located, hinges about seat back hinge point H located at discrete positions along the x-axis. Referring to FIG. 10, with a plurality of transmitters $T_1$ and $T_2$, and a plurality of receivers $R_1$ and $R_2$, four different sets of transmitter/receiver subsystems can be used to analytically solve for the seat track position and the seat back angle. Accordingly, if any one of the paths between a given transmitter and receiver should become blocked, another path can be utilized for the solution.

One of ordinary skill in the art will appreciate that the instant invention can be utilized with other types of safety restraint systems, besides air bag inflators, that are amenable to controllable actuation. Furthermore, transmitter/receiver, ranging and range/proximity sensors that utilize wave energy can utilize any kind of wave energy, for example acoustic energy, audible acoustic energy, inaudible acoustic energy, ultrasonic acoustic energy, electromagnetic energy, radio frequency electromagnetic energy, light, visible light, invisible light, infrared electromagnetic energy, microwave electromagnetic energy, radar energy, pulsed energy, or continuous wave energy. Furthermore, these sensors may be adapted so as to be activated responsive to a crash sensor, for example a crash safing sensor, so that the occupant is not continuously exposed to the wave energy, but is exposed only when a crash is likely to occur. Furthermore, a lighting system for a vision based range/proximity sensor may also be so adapted.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A system for detecting an occupant in a vehicle and for controlling a safety restraint system responsive thereto, comprising:
   a. a first transmitter for generating and transmitting wave energy;
   b. a first receiver for receiving said wave energy and for generating a signal responsive to said wave energy, wherein said wave energy propagates from said first transmitter to said first receiver along a path, the length of said path is responsive to the position of a seat of the vehicle, one of said first transmitter and said first receiver is operatively coupled to a back portion of said seat, and the other of said first transmitter and said first receiver operatively coupled to a fixed interior portion of the vehicle;
   c. a ranging sensor for sensing a first region proximate to a forward surface of a back portion of said seat, whereby said ranging sensor is responsive to the presence of a normally seated occupant in said seat;
   d. a range/proximity sensor for sensing if an object is within a second region proximate to the safety restraint system, wherein the safety restraint system is disabled responsive to the detection of an object within said second region by said range/proximity sensor; and
   e. a controller for controlling the power of the safety restraint system responsive to said signal responsive to said wave energy, and responsive to a signal from said ranging sensor.

2. A system for detecting an occupant in a vehicle and for controlling a safety restraint system responsive thereto as recited in claim 1, wherein said wave energy is selected from the group consisting of acoustic energy, audible acoustic energy, inaudible acoustic energy, ultrasonic acoustic energy, electromagnetic energy, radio frequency electromagnetic energy, light, visible light, invisible light, infrared electromagnetic energy, microwave electromagnetic energy, radar energy, pulsed energy, and continuous wave energy.

3. A system for detecting an occupant in a vehicle and for controlling a safety restraint system responsive thereto as recited in claim 1, wherein said range/proximity sensor is selected from the group consisting of a capacitive sensor, an ultrasonic sensor, a vision system, a radar range finder, a passive infrared sensor, and an optical range finder.

4. A system for detecting an occupant in a vehicle and for controlling a safety restraint system responsive thereto as recited in claim 1, wherein said signal responsive to said wave energy is responsive to a characteristic of said wave energy selected from the group consisting of propagation time, phase, and frequency.

5. A system for detecting an occupant in a vehicle and for controlling a safety restraint system responsive thereto as recited in claim 1, wherein said first transmitter is operatively coupled to a fixed interior portion of the vehicle and said first receiver is operatively coupled to said back portion of said seat.

6. A system for detecting an occupant in a vehicle and for controlling a safety restraint system responsive thereto as recited in claim 5, wherein said ranging sensor determines a range to said forward surface of a back portion of said seat from a signal transmitted by said first transmitter, said controller determines the distance from said first transmitter to said first receiver from said signal responsive to said wave energy, and if the difference between the distance from said first transmitter to said first receiver and said range to said forward surface is less then a threshold, then said controller reduces the power of the safety restraint system.

7. A system for detecting an occupant in a vehicle and for controlling a safety restraint system responsive thereto as recited in claim 6, wherein if a difference between the distance from said first transmitter to said first receiver and said range to said forward surface is less then a threshold, then said controller disables the safety restraint system.

8. A system for detecting an occupant in a vehicle and for controlling a safety restraint system responsive thereto as recited in claim 1, wherein said first transmitter and said ranging sensor share a common transducer.

9. A system for detecting an occupant in a vehicle and for controlling a safety restraint system responsive thereto as recited in claim 1, wherein said ranging sensor comprises said first transmitter and a second receiver.

10. A system for detecting an occupant in a vehicle and for controlling a safety restraint system responsive thereto as recited in claim 1, wherein said ranging sensor comprises a second transmitter and a second receiver.

11. A system for detecting an occupant in a vehicle and for controlling a safety restraint system responsive thereto as recited in claim 10, wherein said ranging sensor depends upon a second wave energy selected from the group consisting of acoustic energy, audible acoustic energy, inaudible acoustic energy, ultrasonic acoustic energy, electromagnetic energy, radio frequency electromagnetic energy, light, visible light, invisible light, infrared electromagnetic energy, microwave electromagnetic energy, radar energy, pulsed energy, and continuous wave energy.

12. A system for detecting an occupant in a vehicle and for controlling a safety restraint system responsive thereto as recited in claim 1, wherein said ranging sensor comprises said first transmitter and said first receiver, wherein said first transmitter and said first receiver are operatively coupled to a fixed interior portion of the vehicle.

13. A system for detecting an occupant in a vehicle and for controlling a safety restraint system responsive thereto as recited in claim 12, wherein said back portion of said seat is adapted so as to provide an identifiable return signal to said first receiver.

14. A system for detecting an occupant in a vehicle and for controlling a safety restraint system responsive thereto as recited in claim 1, wherein said ranging sensor transmits a signal along a path to said first region, and said signal is reflected off an interior portion of the vehicle along said path.

15. A system for detecting an occupant in a vehicle and for controlling a safety restraint system responsive thereto as recited in claim 1, wherein said wave energy propagating along a path between said first transmitter and said first receiver is reflected off an interior portion of the vehicle along said path.

16. A system for detecting an occupant in a vehicle and for controlling a safety restraint system responsive thereto as recited in claim 1, said controller determines the distance from said first transmitter to said first receiver from said signal responsive to said wave energy and said controller controls the power of the safety restraint system responsive to said distance and to a signal from said ranging sensor.

17. A system for detecting an occupant in a vehicle and for controlling a safety restraint system responsive thereto as recited in claim 1, wherein said range/proximity sensor detects if said object is animate, and the safety restraint system is disabled responsive to the detection of an animate object within said second region by said range/proximity sensor.

18. A system for detecting an occupant in a vehicle and for controlling a safety restraint system responsive thereto, comprising:
   a. a first transmitter for generating and transmitting wave energy, wherein said first transmitter is operatively coupled to a back portion of said seat, and said first transmitter is adapted to transmit said wave energy forwards from said seat;
   b. a first receiver for receiving said wave energy and for generating a signal responsive to said wave energy, wherein said wave energy propagates from said first transmitter to said first receiver along a path, and the length of said path is responsive to the position of a seat of the vehicle;
   c. a ranging sensor for sensing a first region proximate to a forward surface of said back portion of said seat, whereby said ranging sensor is responsive to the presence of a normally seated occupant in said seat;
   d. a range/proximity sensor for sensing if an object is within a second region proximate to the safety restraint system, wherein the safety restraint system is disabled responsive to the detection of an object within said second region by said range/proximity sensor; and
   e. a controller for controlling the power of the safety restraint system responsive to said signal responsive to said wave energy, and responsive to a signal from said ranging sensor.

19. A system for detecting an occupant in a vehicle and for controlling a safety restraint system responsive thereto as recited in claim 18, wherein said ranging sensor comprises said first transmitter and a receiver, wherein said receiver of said ranging sensor is selected from the group consisting of said first receiver and a second receiver.

20. A system for detecting an occupant in a vehicle and for controlling a safety restraint system responsive thereto as recited in claim 19, wherein said receiver of said ranging sensor is disposed proximate to said first transmitter so as to receive said wave energy that is reflected by a reflective surface.

21. A system for detecting an occupant in a vehicle and for controlling a safety restraint system responsive thereto as recited in claim 19, wherein said first transmitter and said receiver of said ranging sensor are laterally displaced from one another within said back portion.

22. A system for detecting an occupant in a vehicle and for controlling a safety restraint system responsive thereto as recited in claim 19, wherein said first transmitter and said receiver of said ranging sensor constitute a microwave radar and said wave energy is at least partially reflected by a human body.

23. A system for detecting an occupant in a vehicle and for controlling a safety restraint system responsive thereto as recited in claim 19, wherein said signal responsive to said wave energy is responsive a characteristic of said wave energy selected from the group consisting of propagation time, phase, and frequency.

24. A system for detecting an occupant in a vehicle and for controlling a safety restraint system responsive thereto, comprising:
   a. a first transmitter for transmitting wave energy;
   b. a first receiver for receiving said wave energy and for generating a signal responsive to said wave energy, wherein said wave energy propagates from said first transmitter to said first receiver along a path, and the length of said path is responsive to the position of a seat of the vehicle;
   c. a ranging sensor for sensing a first region proximate to a forward surface of said back portion of said seat, whereby said ranging sensor is responsive to the presence of a normally seated occupant in said seat;
   d. a range/proximity sensor for sensing if an object is within a second region proximate to the safety restraint system, wherein the safety restraint system is disabled responsive to the detection of an object within said second region by said range/proximity sensor; and
   e. a controller for controlling the power of the safety restraint system responsive to said signal responsive to said wave energy, and responsive to a signal from said ranging sensor;
   f. a proximity sensor operatively coupled to said controller and to said back portion of said seat for sensing an object that is proximate to the front side of a back portion of said seat, wherein said controller controls the power of the safety restraint system responsive to a signal from said proximity sensor.

25. A system for detecting an occupant in a vehicle and for controlling a safety restraint system responsive thereto as recited in claim 24, wherein said ranging sensor comprises said proximity sensor.

26. A system for detecting an occupant in a vehicle and for controlling a safety restraint system responsive thereto as recited in claim 24, wherein if said proximity sensor does not detect an occupant proximate said seat, then said controller disables the safety restraint system.

27. A system for detecting an occupant in a vehicle and for controlling a safety restraint system responsive thereto, comprising:
   a. a first transmitter for transmitting wave energy;
   b. a first receiver for receiving said wave energy and for generating a signal responsive to said wave energy, wherein said wave energy propagates from said first transmitter to said first receiver along a path, and the length of said path is responsive to the position of a seat of the vehicle;
   c. a ranging sensor for sensing a first region proximate to a forward surface of a back portion of said seat, whereby said ranging sensor is responsive to the presence of a normally seated occupant in said seat;
   d. a range/proximity sensor for sensing if an object is within a second region proximate to the safety restraint system, wherein the safety restraint system is disabled responsive to the detection of an object within said second region by said range/proximity sensor; and
   e. a controller for controlling the power of the safety restraint system responsive to said signal responsive to said wave energy, and responsive to a signal from said ranging sensor; and
   f. a proximity sensor operatively coupled to said controller for sensing an object that is proximate to the front side of a back portion of said seat, wherein said proximity sensor comprises a capacitive sensor located in an upper portion of said back portion of said seat for sensing a dielectric mass proximate to said seat, and said controller controls the power of the safety restraint system responsive to a signal from said proximity sensor.

28. A system for detecting an occupant in a vehicle and for controlling a safety restraint system responsive thereto as recited in claim 27, wherein said capacitive sensor comprises an electrode, and said electrode reflects said wave energy from said first transmitter to said first receiver.

29. A system for detecting an occupant in a vehicle and for controlling a safety restraint system responsive thereto, comprising:
   a. a first transmitter for transmitting wave energy;
   b. a first receiver for receiving said wave energy and for generating a signal responsive to said wave energy, wherein said wave energy propagates from said first transmitter to said first receiver along a path, and the length of said path is responsive to the position of a seat of the vehicle;
   c. a ranging sensor for sensing a first region proximate to a forward surface of a back portion of said seat, whereby said ranging sensor is responsive to the presence of a normally seated occupant in said seat;
   d. a range/proximity sensor for sensing if an object is within a second region proximate to the safety restraint system, wherein the safety restraint system is disabled responsive to the detection of an object within said second region by said range/proximity sensor; and
   e. a controller for controlling the power of the safety restraint system responsive to said signal responsive to said wave energy, and responsive to a signal from said ranging sensor, wherein the controller measures the period of time over which said difference between the distance from said first transmitter to said first receiver and said range to said forward surface is less then said threshold, and said power of the safety restraint system is reduced after said period of time exceeds a second threshold.

30. A system for detecting an occupant in a vehicle and for controlling a safety restraint system responsive thereto as recited in claim 29, wherein the safety restraint system is disabled after said period of time exceeds said second threshold.

31. A method of detecting an occupant in a vehicle and for controlling the actuation of a safety restraint system responsive thereto, comprising:
   a. measuring a first distance to a back portion of a seat of the vehicle;
   b. measuring a second distance to the front surface of said back portion of said seat;
   c. detecting if an object is within a region proximate to the safety restraint system, wherein an occupant positioned within said region would be at risk of injury from the safety restraint system;
   d. disabling the actuation of the safety restraint system responsive to the detection of an object within said region; and
   e. controlling the power of the safety restraint system responsive to the difference between said first and second distance.

32. A method of detecting an occupant in a vehicle and for controlling the actuation of a safety restraint system responsive thereto as recited in claim 31, wherein the power of the safety restraint system is controlled responsive to said first distance and responsive to said second distance.

33. A method of detecting an occupant in a vehicle and for controlling the actuation of a safety restraint system responsive thereto as recited in claim 31, wherein the actuation of the safety restraint system is disabled if said object within said region is a body part.

34. A method of detecting an occupant in a vehicle and for controlling the actuation of a safety restraint system responsive thereto as recited in claim 31, wherein if the difference between said first and second distance is less than a threshold, then reducing the power of the safety restraint system.

35. A method of detecting an occupant in a vehicle and for controlling the actuation of a safety restraint system responsive thereto as recited in claim 32, wherein if the difference between said first and second distance is less than a threshold, then the safety restraint system is disabled.

36. A method of detecting an occupant in a vehicle and of controlling the actuation of a safety restraint system responsive thereto, comprising:
   a. measuring a first distance to a back portion of a seat of the vehicle;
   b. measuring a second distance to the front surface of said back portion of said seat;
   c. detecting if an object is within an region proximate to the safety restraint system, wherein an occupant positioned within said region would be at risk of injury from the safety restraint system;
   d. disabling the actuation of the safety restraint system responsive to the detection of an object within said region;
   e. controlling the power of the safety restraint system responsive to the difference between said first and second distance, wherein if the difference between said first and second distance is less than a threshold, then reducing the power of the safety restraint system; and
   f. measuring the period of time over which said difference is less than said threshold, wherein the power of the safety restraint system is reduced after said period of time exceeds a second threshold.

37. A method of detecting an occupant in a vehicle and of controlling the actuation of a safety restraint system responsive thereto, comprising:
   a. measuring the proximity of an occupant relative to a back portion of a seat of a vehicle;
   b. detecting if an object is within a region proximate to the safety restraint system, wherein an occupant positioned within said region would be at risk of injury from the safety restraint system;
   c. disabling the actuation of the safety restraint system responsive to the detection of an object within said region;
   d. reducing the power of the safety restraint system if an occupant is not proximate to said back portion of said seat; and
   e. measuring the period of time over which the occupant is not proximate to said back portion of said seat, wherein the power of the safety restraint system is reduced after said period of time exceeds a second threshold.

38. A method of detecting an occupant in a vehicle and for controlling the actuation of a safety restraint system responsive thereto as recited in claim 37, wherein if the occupant is not proximate to said back portion of said seat, then the safety restraint system is disabled.

39. A method of detecting an occupant in a vehicle and for controlling the actuation of a safety restraint system responsive thereto as recited in claim 37, wherein the power of the safety restraint system is responsive to the proximity of the occupant to said back portion of said seat.

40. A method of detecting an occupant in a vehicle and for controlling the actuation of a safety restraint system responsive thereto as recited in claim 37, wherein the actuation of the safety restraint system is disabled if said object within said region is a body part.

41. A system for sensing the position of a seat of a vehicle, comprising:
   a. a set of transmitters and receivers, wherein each said transmitter generates and transmits an associated at least one wave signal to at least one of said receivers, each said receiver generates a signal responsive to said associated at least one wave signal, said set comprises at least one transmitter and at least one receiver, the total number of transmitters and receivers in said set is at least three, a first group comprising at least two like elements of said set are disposed in the seat at distinct locations therein, and a second group comprising at least one element of said set is operatively connected to a fixed interior portion of the vehicle; and
   b. a processor for determining a set of distance measurements comprising measurements of the distance from wave signals between each element of said first group of elements of said set and each element of said second group of elements of said set, and for calculating the position of the seat along a seat track and the angle of a back portion of said seat from said set of distance measurements, wherein each of said distance measurements is measured from a characteristic of said associated wave signal.

42. A system for sensing the position of a seat of a vehicle as recited in claim 41, wherein said characteristic of said associated wave signal is selected from the group consisting of propagation time, phase shift, and frequency difference relative to a received signal in comparison with an associated transmitted signal.

43. A system for sensing the position of a seat of a vehicle as recited in claim 41, wherein said wave signal comprises wave energy selected from the group consisting of acoustic energy, audible acoustic energy, inaudible acoustic energy, ultrasonic acoustic energy, electromagnetic energy, radio frequency electromagnetic energy, light, visible light, invisible light, infrared electromagnetic energy, microwave electromagnetic energy, radar energy, pulsed energy, and continuous wave energy.

44. A system for sensing the position of a seat of a vehicle as recited in claim 41, wherein said set of transmitters and receivers comprises a first transmitter paired with a first receiver and a second transmitter paired with a second receiver, wherein said first transmitter and said first receiver are operative between a first fixed portion of the vehicle and a first point in the seat, and said second transmitter and said second receiver are operative between a second fixed portion of the vehicle and a second point in the seat.

45. A system for sensing the position of a seat of a vehicle as recited in claim 44, wherein said first point in the seat is in a back portion of the seat and said second point in the seat is in said back portion of the seat at a distinct location from said first point in the seat.

46. A system for sensing the position of a seat of a vehicle as recited in claim 44, wherein said first point in the seat is in a back portion of the seat and said second point in the seat is in a base portion of the seat.

47. A system for sensing the position of a seat of a vehicle as recited in claim 44, wherein said first fixed portion of the vehicle is the same as said second fixed portion of the vehicle.

48. A system for sensing the position of a seat of a vehicle as recited in claim 44, wherein said processor communicates said position of the seat along a seat track and said angle of said back portion of said seat to another system in the vehicle so as to enable said another system to adapt to the position of the seat.

49. A system for sensing the position of a seat of a vehicle, comprising:
   a. a set of transmitters and receivers, wherein each said transmitter transmits an associated at least one wave signal to at least one of said receivers, said set comprises at least one transmitter and at least one receiver, the total number of transmitters and receivers in said set is at least three, a first group comprising at least two like elements of said set are disposed in the seat at distinct locations therein, a second group comprising at least one element of said set is operatively connected to a fixed interior portion of the vehicle, said set of transmitters and receivers comprises a first transmitter paired with a first receiver and a second transmitter paired with a second receiver, said first transmitter and said first receiver are operative between a first fixed portion of the vehicle and a first point in the seat, said second transmitter and said second receiver are operative between a second fixed portion of the vehicle and a second point in the seat, said first fixed portion of the vehicle is rearwards of a back portion of the seat and said second fixed portion of the vehicle is forwards of said back portion of the seat; and
   b. a processor for determining a set of distance measurements comprising measurements of the distance from wave signals between each element of said first group of elements of said set and each element of said second group of elements of said set, and for calculating the position of the seat along a seat track and the angle of a back portion of said seat from said set of distance measurements, wherein each of said distance measurements is measured from a characteristic of said associated wave signal.

50. A method of sensing the position of a seat of a vehicle, comprising:
   a. measuring a first distance from a first fixed point of the vehicle interior to a first point on the seat between a first transmitter and a first receiver, wherein one of said transmitter and said receiver is located in the seat, said first transmitter generates and transmits a first wave signal to said first receiver, said first receiver generates a first signal responsive to said first wave signal, and said first distance is measured responsive to said first signal from a characteristic of said first wave signal selected from the group consisting of propagation time, phase shift, and frequency difference relative to a received signal in comparison with an associated transmitted signal;
   b. measuring a second distance from a second fixed point of the vehicle interior to a second point on the seat between a second transmitter and a second receiver, wherein one of said transmitter and said receiver is located in the seat, said second transmitter generates and transmits a second wave signal to said second receiver, said second receiver generates a second signal responsive to said second wave signal, and said second distance is measured responsive to said second signal from a characteristic of said second wave signal selected from the group consisting of propagation time, phase shift, and frequency difference relative to a received signal in comparison with an associated transmitted signal; and
   c. calculating the position of the seat along a seat track and the angle of a back portion of the seat from said first and second distance measurements.

51. A method of sensing the position of a seat of a vehicle as recited in claim 50, wherein said first fixed point of the vehicle interior is at a different location from said second fixed point of the vehicle.

52. A method of sensing the position of a seat of a vehicle, comprising:
   a. measuring a first distance from a first fixed point of the vehicle interior to a first point on the seat between a first transmitter and a first receiver, wherein one of said transmitter and said receiver is located in the seat, said first transmitter transmits a first wave signal to said first receiver, and said first distance is measured from a characteristic of said first wave signal selected from the group consisting of propagation time, phase shift, and frequency difference relative to a received signal in comparison with an associated transmitted signal;
   b. measuring a second distance from a second fixed point of the vehicle interior to a second point on the seat between a second transmitter and a second receiver, wherein one of said transmitter and said receiver is located in the seat, said second transmitter transmits a second wave signal to said second receiver, and said second distance is measured from a characteristic of said second wave signal selected from the group consisting of propagation time, phase shift, and frequency difference relative to a received signal in comparison with an associated transmitted signal; and
   c. calculating the position of the seat along a seat track and the angle of a back portion of the seat from said first and second distance measurements, wherein the operation of calculating the position of the seat along a seat track and the angle of a back portion of said seat from said first and second distance measurements comprises:
   i. for each position of the seat along said seat track, storing a first characteristic in memory, wherein said first characteristic comprises said first distance as a function of said angle of said back portion of the seat;
   ii. for each position of the seat along said seat track, storing a second characteristic in memory, wherein said second characteristic comprises said second distance as a function of said angle of said back portion of the seat;
   iii. calculating a cost function using said first and second characteristic functions from said first and second distance measurements at a plurality of positions of the seat along said seat track;
   iv. finding a position of the seat along said seat track that minimizes said cost function; and
   v. finding an angle of said back portion of said seat from said position of the seat along said seat track that minimizes said cost function, one of said distance measurements, and a corresponding one of said characteristic functions.

\* \* \* \* \*